United States Patent
Juillard

(10) Patent No.: US 10,257,259 B2
(45) Date of Patent: Apr. 9, 2019

(54) MANIFEST SCHEMA TO PROVIDE APPLICATION FLOWS

(71) Applicant: salesforce.com, inc., San Francisco, CA (US)

(72) Inventor: Loic Juillard, Novato, CA (US)

(73) Assignee: salesforce.com, inc., San Francisco, CA (US)

(*) Notice: Subject to any disclaimer, the term of this patent is extended or adjusted under 35 U.S.C. 154(b) by 649 days.

(21) Appl. No.: 14/504,334

(22) Filed: Oct. 1, 2014

(65) Prior Publication Data

US 2015/0121239 A1 Apr. 30, 2015

Related U.S. Application Data

(60) Provisional application No. 61/895,748, filed on Oct. 25, 2013.

(51) Int. Cl.
*G06F 3/00* (2006.01)
*H04L 29/08* (2006.01)
*G06F 9/54* (2006.01)
*G06F 3/01* (2006.01)

(52) U.S. Cl.
CPC .......... *H04L 67/10* (2013.01); *G06F 9/54* (2013.01); *H04L 67/327* (2013.01); *H04L 67/36* (2013.01)

(58) Field of Classification Search
CPC .. G06F 9/44526; G06F 9/4443; G06F 17/243; G06F 17/24; G06F 8/60; G06F 8/61
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |

(Continued)

*Primary Examiner* — Nicholas Augustine
(74) *Attorney, Agent, or Firm* — Jaffery, Watson, Mendonsa & Hamilton, LLP

(57) ABSTRACT

Embodiments regard manifest schema to provide application flows. An embodiment of a method includes: loading a manifest schema on a device, the manifest schema including a parent manifest and one or more application manifests; making a call to a server to populate a user interface of the device based on the manifest schema; upon receiving a message at the mobile device, utilizing the parent manifest to automatically select an application for routing of the message, the selection of the application being based on contents of the message; and utilizing an application manifest for the selected application to automatically select a process for routing of the message, the selection of the process being based on the contents of the message using an application manifest for the selected application.

24 Claims, 28 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,868,539 B1 * | 3/2005 | Travison ............... G06F 8/63 717/100 |
| 7,340,411 B2 | 3/2008 | Cook |
| 7,620,655 B2 | 11/2009 | Larsson et al. |
| 8,352,384 B2 | 1/2013 | Mansinghka et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0027864 A1 | 2/2007 | Collins et al. |
| 2007/0250783 A1 * | 10/2007 | Wu ..................... G06F 17/243 715/762 |
| 2008/0082555 A1 | 4/2008 | Salmon et al. |
| 2009/0172637 A1 * | 7/2009 | Parikh .................... G06F 8/427 717/114 |
| 2009/0198684 A1 | 8/2009 | Collins et al. |
| 2010/0070528 A1 | 3/2010 | Collins et al. |
| 2010/0241951 A1 | 9/2010 | Vandervort et al. |
| 2011/0004668 A1 | 1/2011 | Salmon et al. |
| 2011/0082854 A1 | 4/2011 | Eidson et al. |
| 2011/0246449 A1 | 10/2011 | Collins et al. |
| 2011/0258178 A1 | 10/2011 | Eidson et al. |
| 2011/0258179 A1 | 10/2011 | Weissman et al. |
| 2011/0282847 A1 | 11/2011 | Collins et al. |
| 2011/0282864 A1 | 11/2011 | Collins et al. |
| 2011/0282881 A1 | 11/2011 | Collins et al. |
| 2011/0289091 A1 | 11/2011 | Collins et al. |
| 2011/0295838 A1 | 12/2011 | Collins et al. |
| 2011/0295839 A1 | 12/2011 | Collins et al. |
| 2011/0320435 A1 | 12/2011 | Collins et al. |
| 2012/0023375 A1 | 1/2012 | Dutta et al. |
| 2012/0131068 A1 | 5/2012 | Scotton et al. |
| 2012/0151062 A1 | 6/2012 | Gusev et al. |
| 2012/0233354 A1 | 12/2012 | Salmon et al. |
| 2012/0330924 A1 | 12/2012 | Rajan et al. |
| 2012/0330926 A1 | 12/2012 | Rajan et al. |
| 2013/0018890 A1 | 1/2013 | Rajan et al. |
| 2013/0054648 A1 | 2/2013 | Mehta et al. |
| 2013/0091252 A1 * | 4/2013 | Pizzorni ............... G06Q 10/10 709/219 |
| 2013/0332917 A1 * | 12/2013 | Gaither ................. G06F 8/656 717/170 |
| 2014/0012817 A1 | 1/2014 | Kim et al. |
| 2014/0040235 A1 | 2/2014 | Rajan et al. |
| 2014/0047429 A1 * | 2/2014 | Gaither ................. G06F 8/60 717/170 |
| 2014/0081950 A1 | 3/2014 | Rajan et al. |
| 2015/0026658 A1 * | 1/2015 | Jones .................. G06F 9/4488 717/108 |

\* cited by examiner

MANIFEST SCHEMA TO PROVIDE APPLICATION FLOWS

CROSS REFERENCE TO RELATED APPLICATIONS

This United States patent application is related to and claims priority to U.S. Provisional Patent Application No. 61/895,748 filed Oct. 25, 2013, entitled "MANIFEST SCHEMA TO PROVIDE APPLICATION FLOWS," the entire contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate to computing network operation. More particularly, embodiments relate to manifest schema to provide application flows.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Devices such as electronic mobile devices continue to increase in computing power and complexity, allowing greater and greater functionality for such devices. Handheld devices now handle computing tasks that previously required larger computing system.

For example, mobile devices are increasingly used in multi-tenant environments in which many tenant users are accessing database resources.

However, the use of mobile devices in complex environments such as multi-tenant environment creates complications in the establishment and maintenance of the workflow applications and processes on the mobile device, where changes in applications and processes may require significant changes in the computing environment.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments may be practiced without these specific details. In other instances, well-known circuits, structures and techniques have not been shown in detail in order not to obscure the understanding of this description.

As used herein, "mobile device" means a smartphone, smartwatch, tablet computer, notebook or laptop computer, handheld computer, mobile Internet device, wearable technology, or other mobile electronic device that includes processing and display capability.

In some embodiments, a manifest schema is utilized to provide application flows. In some embodiments, the manifest schema is used, for example, in a multitenant environment (such as a Salesforce® application of salesforce.com) to drive the user interface (UI) and application flow, including, but not limited to, the UI and application flow of mobile devices. In some embodiments, the manifest schema may be utilized to simplify the maintenance of the computing environment of a mobile device.

In some embodiments, a manifest is used to drive the UI of applications. In a particular example for a Salesforce operation, there may be two processes available:

As setForce™

StatusForce™

In some embodiments, a manifest allows a system to establish applications and processes for a system or device, including a mobile device, without requiring the restructuring or rewriting of the computing environment of the system or device. In some embodiments, the manifest allows dynamic modifications of the computing environment of a system or device as needed by modification of the manifest.

Figure 1A:
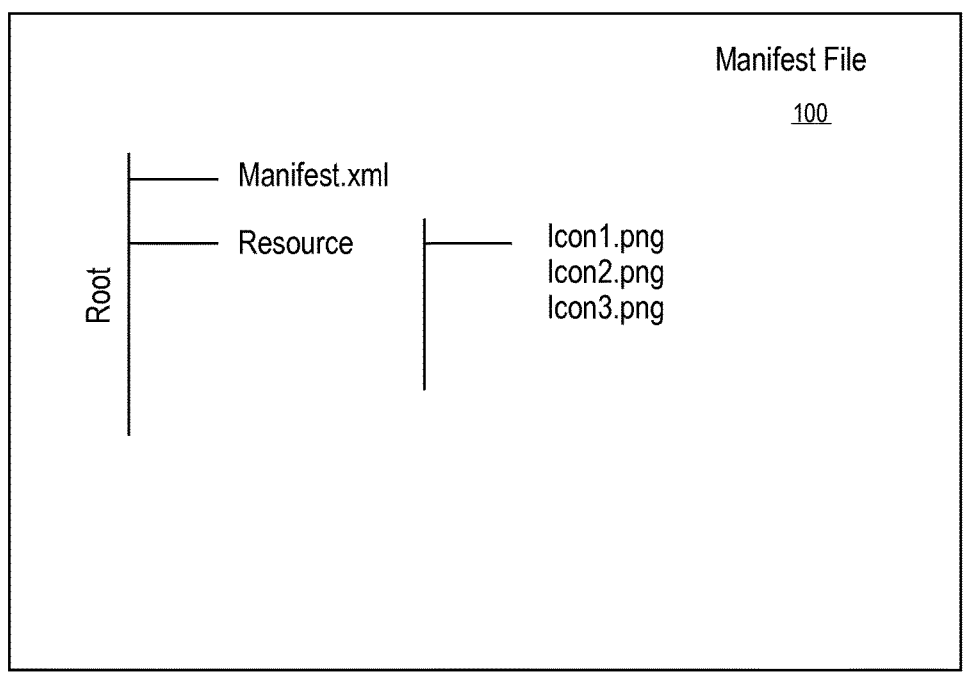
FIG. 1A is an illustration of a manifest file according to an embodiment.

FIG. 1A is an illustration of a manifest file according to an embodiment. In some embodiments, a manifest file 100 may be structured in varying formats, such as a standard ZIP archive file. In one embodiment, the manifest file 100 can include a XML file (such as Manifest.xml in FIG. 1A) that describes what processes to display in the phone/tablet/mobile application as well as global settings for the application. In one embodiment, the Manifest.xml file and Resources may be at the root of the ZIP archive, as opposed to a subfolder of the archive.

In one embodiment, an XSD (XML Schema Definition) will define possible interactions between the XML definition and the UI. In one embodiment, all Manifest.xml files are to be validated with the XSD, and only valid XML files will be accepted by the application.

In one embodiment, icons are contained in a "Resource" folder of the application manifest. In one embodiment, all relative UIR (User Interface Requirement) references within the Manifest.xml file are rooted in the same location as the Manifest.xml file. As illustrated in FIG. 1A, the manifest file 100 includes icon files icon1 through icon3.

It is noted that FIG. 1A contains a simplified file for illustration. A file in operation may include a much larger number of elements.

Figure 1B:
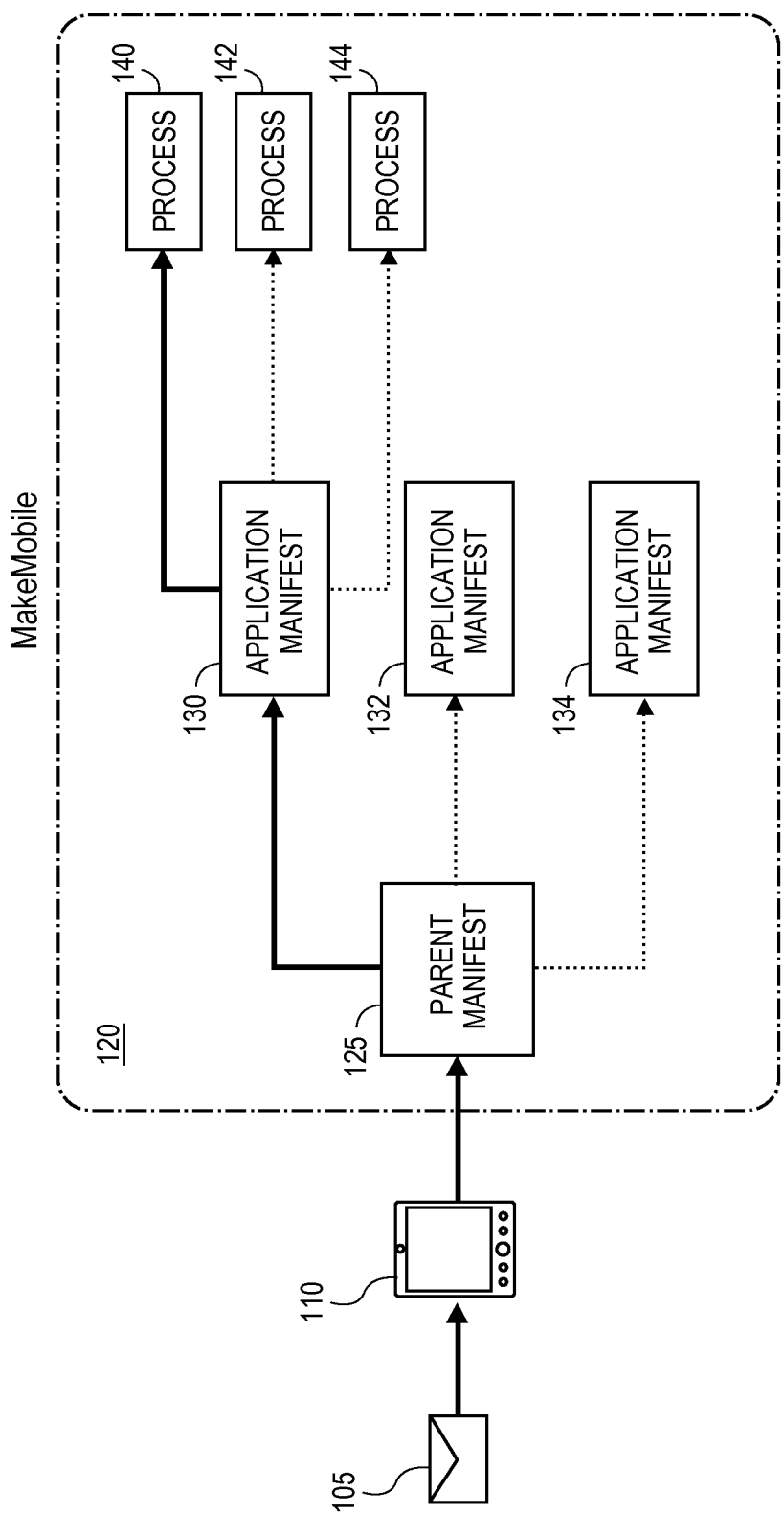
FIG. 1B is a high level illustration of a manifest in a work flow according to an embodiment.

FIG. 1B is a high level illustration of a manifest in a workflow according to an embodiment. In some embodiments, the manifest will load onto the workflow, driving the UI and behavior of the application of a mobile device, such as, for example, a smartphone, tablet, or other mobile device. The application will then make calls to the server to populate the UI.

In one embodiment, StatusForce supports notifications via Apple's Push Notification service. The manifest defines how notifications are routed to the processes that handle them, with FIG. 1B illustrating at a high level how this happens.

In one embodiment, a message 105 is received by the device 110 and sent to the manifest schema (MakeMobile in this illustration) 120 by, as an example, the iOS operating system, the manifest schema 120 then uses the parent manifest 125 to select which application to route to. The manifest schema 120 fetches the selected application manifest from application manifests 130-134, such as a selection of application manifest 130, and uses the selected application manifest 130 to determine which process, of processes 140-144 for the selected application, to route to. In the illustrated example, process 140 is selected. FIG. 1B illustrates one example using a particular mobile operating system, but embodiments are not limited to any particular operating system. Other mobile operating systems (such as Android, Windows Phone, Windows RT, Blackberry, Linux, Symbion, Sailfish, and webOS) may also be supported.

In one embodiment, the message 105 contains information such as the application name, the event name, the object type, the record type, the organization identifier and the object identifier, wherein certain of these elements may be optional. In this example, the information (such as the information other than the organization identifier and object identifier in this example) is used to route the message to its final destination. Embodiments are not limited to the particular information indicated, and other and/or different information can also be included in the message 105.

Figure 2:
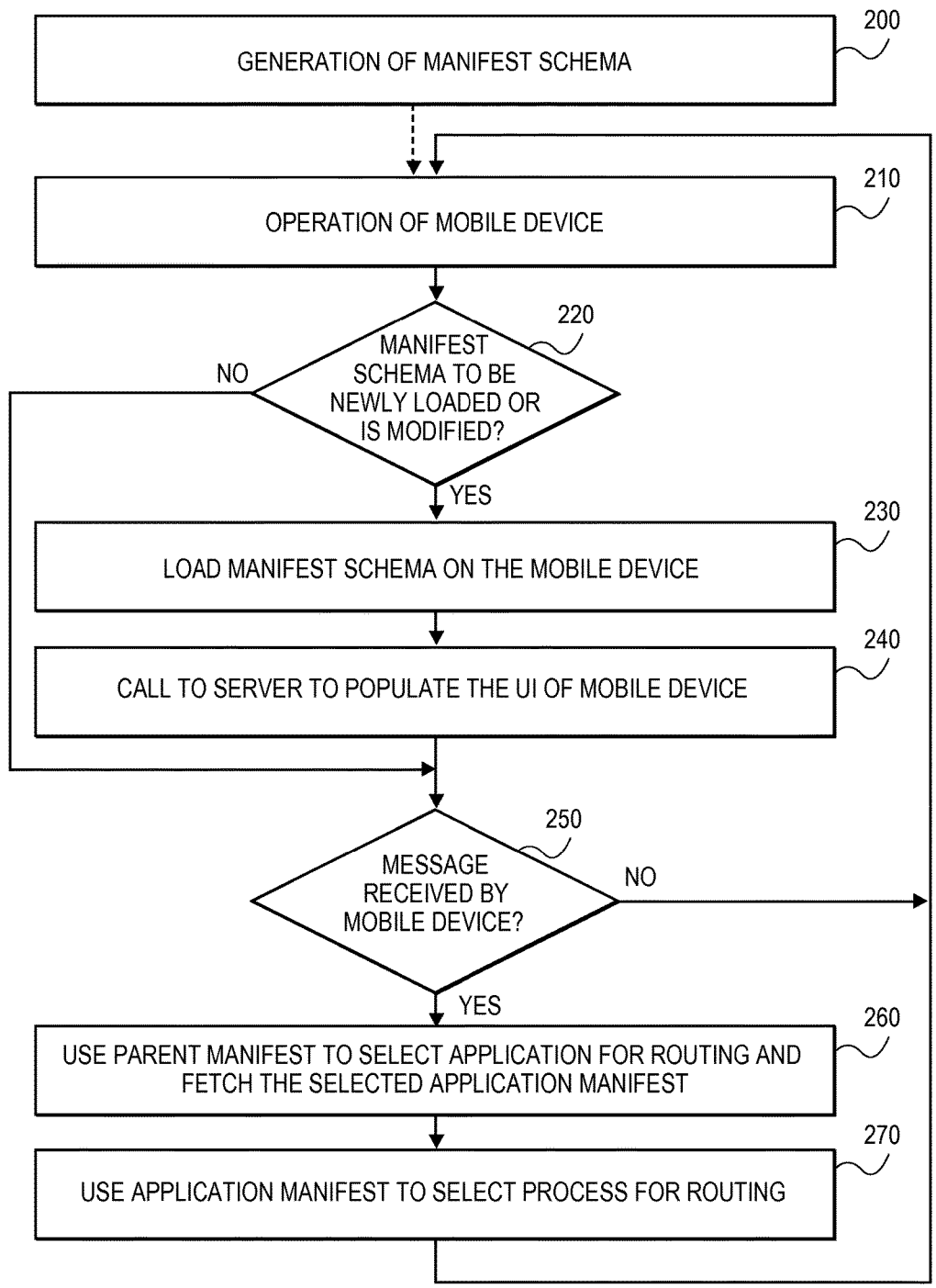
FIG. 2 is a flowchart to illustrate an embodiment of a process utilizing a manifest schema to provide application workflows.

FIG. 2 is a flowchart to illustrate an embodiment of a process utilizing a manifest schema to provide application workflows. In some embodiments, a manifest schema is generated 200. The manifest may be generated or modified at any time. As illustrated in FIG. 2, a mobile device may commence or continue operation 210. If the manifest is to be newly loaded (such as in commencing operation on the mobile device) or is modified (such as in a dynamic change to the manifest for the mobile device) 220, the manifest schema is loaded on the mobile device 230 and there is a call to the server to populate the user interface of the mobile device 240.

In some embodiments, if a message is received by the mobile device 250 the parent manifest of the manifest schema is used to select an application for routing, and the selected application manifest is fetched 260. In some embodiments, the parent manifest includes an ordered set of application notification nodes for matching with the contents of the message. In some embodiments, a first most specific match of a notification node is selected by the manifest schema for routing of the message to an application.

In some embodiments, the selected application manifest may then be used to select a process for routing 270, and then continuing with the operation of the mobile device 210. In some embodiments, the selected application manifest includes an ordered set of process notification nodes for matching with the contents of the message. In some embodiments, a first most specific match of a notification node is selected by the manifest schema for routing of the message to a process.

Figure 3:
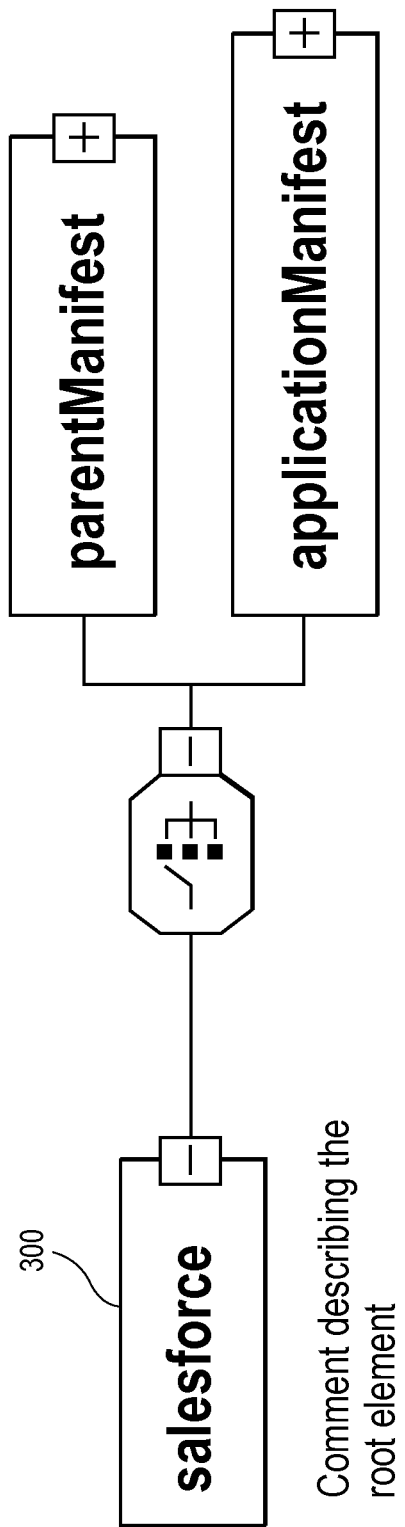
FIG. 3 is an illustration of a manifest file structure according to an embodiment.

FIG. 3 is an illustration of a manifest file structure according to an embodiment. The start of the application, the anchor (salesforce in this illustration) 300, which is the single entry point to the API, is displayed in FIG. 3. From the root there may be a parent manifest tag or an application manifest tag within the schema.

Note: This document provides illustrations in the form of XML Spy generated schema diagrams to provide a graphical view of an XSD. However, embodiments are not limited to the specific structures in these illustrations.

Figure 4:
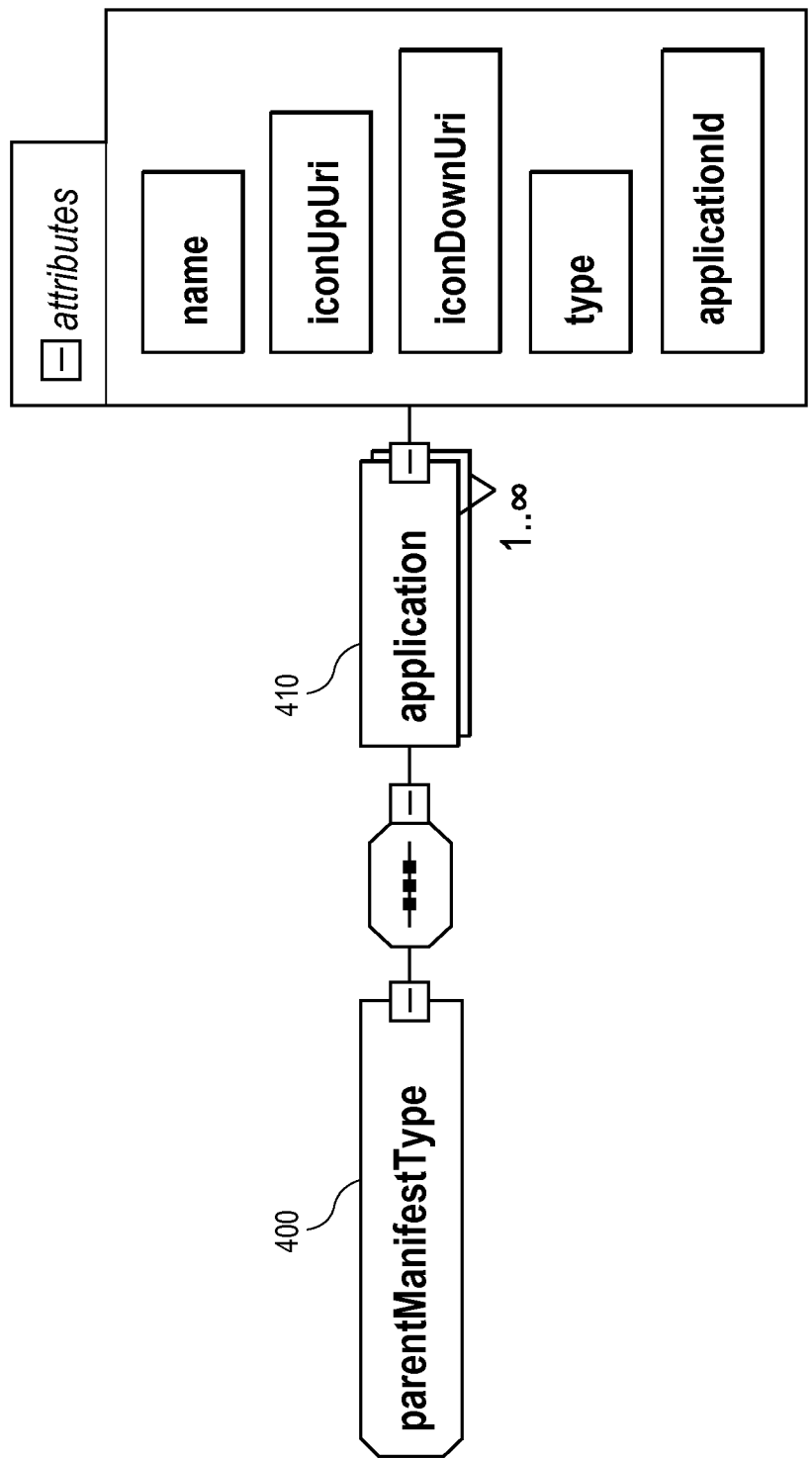
FIG. 4 is an illustration of a file structure including a parent manifest type according to an embodiment.

FIG. 4 is an illustration of a file structure including a parent manifest type according to an embodiment. In some embodiments, a parent manifest type 400 is used to drive the main menu wallet that is used to facilitate the display and ultimately facilitate user selection of an application or process. In some embodiments, the display includes the list of applications the current user will have access to.

In the illustrated example, the attributes of the application may include:

Name: A human readable description of this application element.

iconUpUri: Icon URI (Uniform Resource Identifier) representing the application when the icon in the up position (a non-depressed state for a virtual key, which may also be referred to as an up state).

iconDownUri: Icon URI representing the application when the icon in the down position (a depressed state for a virtual key, which may also be referred to as a down state).

type: Entity describes the UI type that the application should use.

applicationID: Describes the location of application manifests, such as the Force.com silo where the applications manifests are located.

Figure 5:
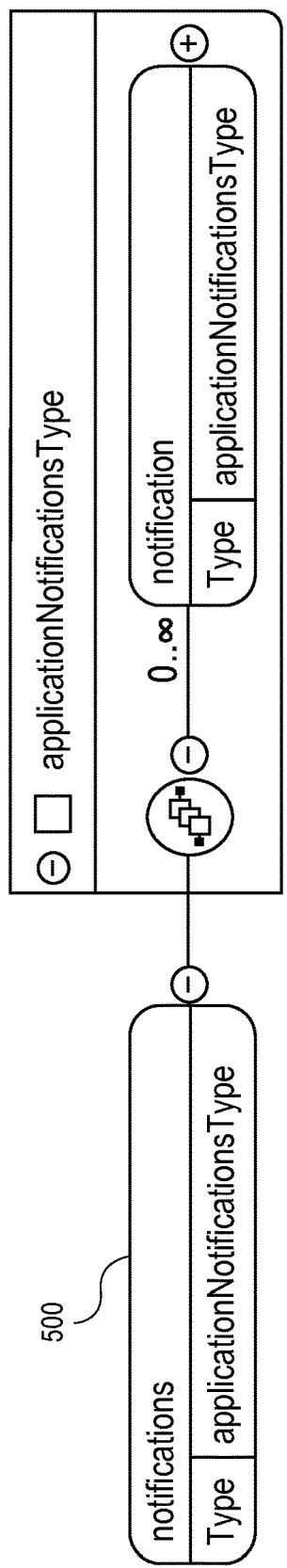
FIG. 5 is an illustration of notification nodes for routing to applications according to an embodiment.

FIG. 5 is an illustration of notification nodes for routing to applications according to an embodiment. In one embodiment, notifications 500 represent an ordered list of notification nodes. This information is used by, for example, a manifest schema (such as MakeMobile 120 in FIG. 1B) to send a push notification to a correct application. When a notification is opened by the user, the manifest schema attempts to open a correct application and process to display the details of the notification. The notifications nodes in the parent process define the information needed to choose the correct application.

An example notification routing may appear as follows:

```
<notifications>
    <notification objectType="Case" recordType="Incident" event="Sev1"
applicationRef="IncidentApp" />
    <notification objectType="Case" recordType="RMA" event="Sev1"
applicationRef="RMAApp" />
    <notification objectType="Case" recordType="RMA"
applicationRef="RMAApp" />
</notifications>
```

In some embodiments, the notifications 500 in FIG. 5 represent a list of notification nodes that are examined in order to determine message routing. Each message coming into the system has an object type, record type and event associated with it. In some embodiments, the first most specific match (the first node encountered that matches the greatest number of attributes) is the one that is used to route the message to an application.

In one embodiment, if no matching node is found an error message is displayed to the end user when a notification is sent.

Figure 6:
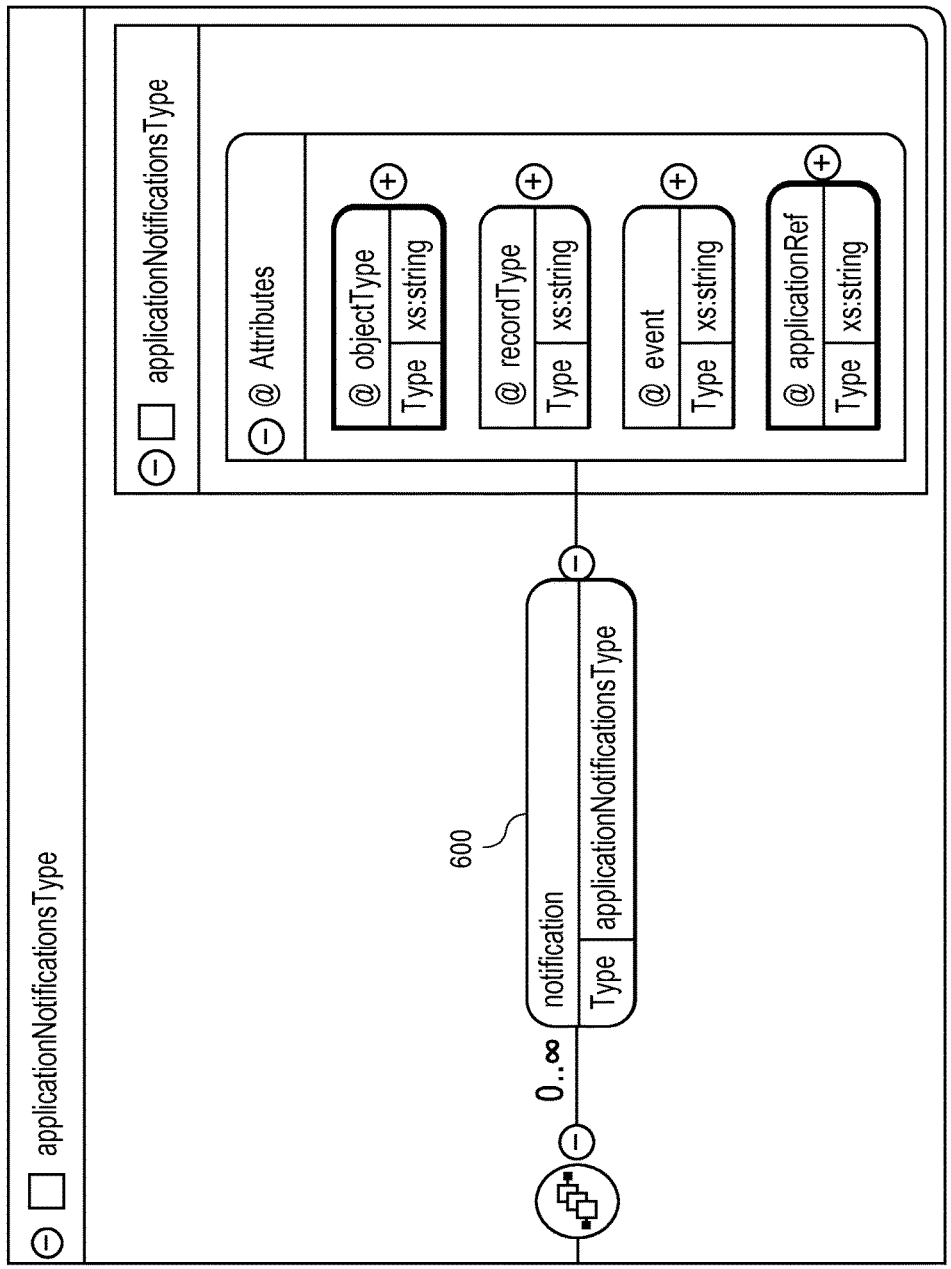
FIG. 6 is an illustration of an application notification node for routing to an application according to an embodiment.

FIG. 6 is an illustration of an application notification node for routing to an application according to an embodiment. In one embodiment, the notification node 600 (which may also be referred to as an application notification node) specifies a single matching route for a message. The notification node 600 includes an application notification type including certain attributes. The manifest schema (MakeMobile) will attempt to match on as many attributes of the notification node as is possible. In some embodiments, the first most specific matching notification node (the first node encountered that matches the greatest number of attributes) will be used to select which application to route to.

As illustrated in FIG. 6, the notification attributes may include:

objectType: (Required): The object type the notification message is for. In an example, the object type is required to be the unique API (Application Programming Interface) name of the SalesForce object the message is for.

recordType (Optional): This attribute identifies a specific record type the message is required to match. In an example, the record type may be an alphanumeric identifier of the record type, such as either the 15-character or 18-character length alphanumeric Salesforce identifier or the API name of the record type. The record type generally cannot be the display name of the record type because such display names are not unique. If the record type is not specified, this field will match any record type.

event: (Optional): This attribute identifies a specific event the message is required to match. In some embodiments, the event may be any arbitrary string that is used to define an event. For example, developers of the client and server notification may agree on an event name and use this same name on the sending and receiving of the message. If event is not specified, this field will match any event.

applicationRef (Required): This attribute defines which application within the parent manifest the message should go to if it matches this route. In some embodiments, the attribute is required to match one of the applicationID values defined in the parent manifest's application nodes, as described further below.

For examples provided herein, the following configuration of notification nodes is used in a particular parent manifest:

```
<notifications>
    <!-- Route 1 -->
    <notification objectType="Case" recordType="Incident" event="Sev1"
applicationRef="IncidentApp" />
    <!-- Route 2 -->
    <notification objectType="Case" recordType="RMA"
applicationRef="CaseApp" />
    <!-- Route 3 -->
    <notification objectType="Case" recordType="RMA" event="Sev1"
applicationRef="RMAApp" />
    <!-- Route 4 -->
    <notification objectType="Case" recordType="RMA" event="Sev2"
applicationRef="RMAApp" />
    <!-- Route 5 -->
    <notification objectType="Case" applicationRef="CaseApp" />
</notifications>
```

This configuration indicates:

All Sev1 Incident messages go to IncidentApp;

All Sev1 and Sev2 RMA messages go to RMAApp;

All other RMA messages go to CaseApp; and

All other Case messages (including Incidents and RMAs that don't match the above) go to CaseApp.

For example:

| Message | Routes To | Why |
|---------|-----------|-----|
| objectType = "Case" recordType = "Incident" event = "Sev1" | IncidentApp | Matches Route 1 because it is the first route where object type, record type and event match. |
| objectType = "Case" recordType = "RMA" event = "Sev1" | RMAApp | Matches Route 3 because it is the first route where object type, record type and event match. Although it also matches Route 2, Route 3 is more specific. |

-continued

| Message | Routes To | Why |
|---|---|---|
| objectType = "Case" recordType = "RMA" event = "Foo" | CaseApp | Matches Route 2 because it is the first route where object type and record type. There is no route that has event = "Foo" and it is more specific than Route 5, which only matches the object type. |
| objectType = "Case" recordType = "Incident" event = "Sev2" | CaseApp | Matches Route 5 because it matches on object type. Route 1 is the only other route that matches on record type but it does not match on event. |
| objectType = "Case" event = "Sev1" | CaseApp | Matches Route 5 because it matches on object type. All the other routes have record types that are either Incident or RMA. |
| objectType = "Banana" | Error | Doesn't match any route. |

Figure 7:
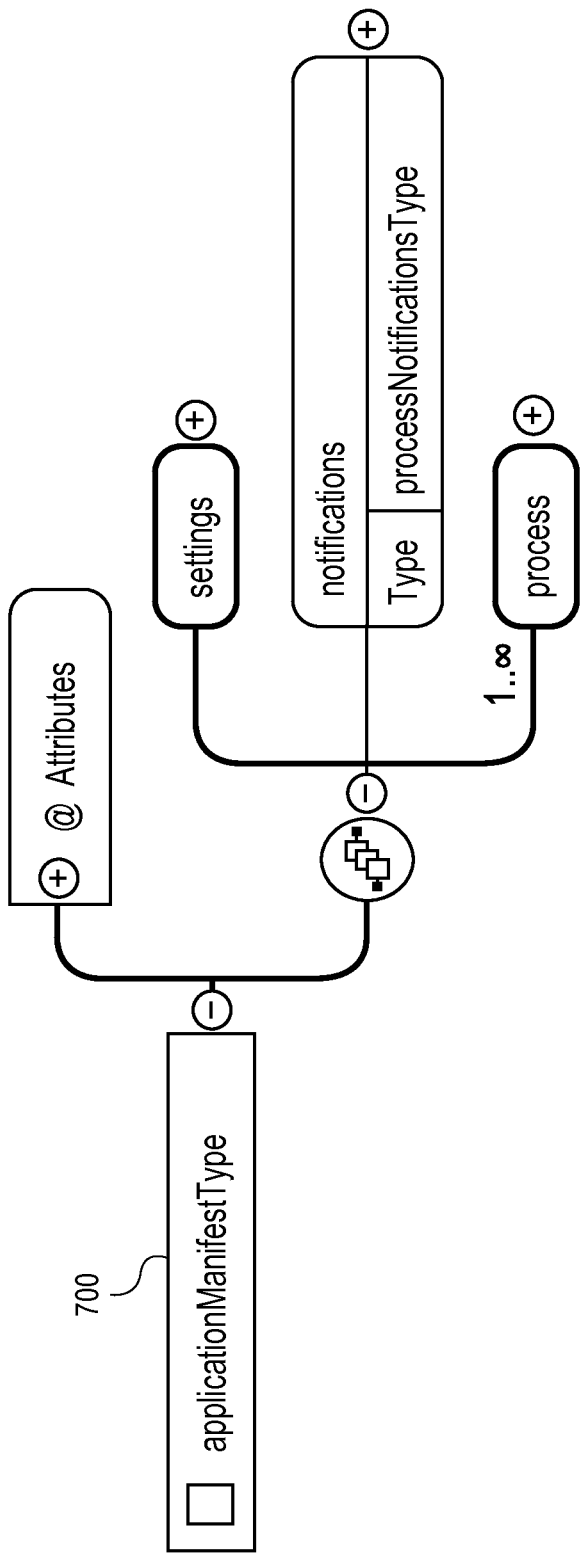
FIG. 7 is an illustration of an application manifest type according to an embodiment.

FIG. 7 is an illustration of an application manifest type according to an embodiment. In some embodiments, the application manifest is used to describe the UI of an application (process). As illustrated in FIG. 7, an application manifest type 700 includes attributes and is associated with notifications, settings, and a process.

Figure 8:
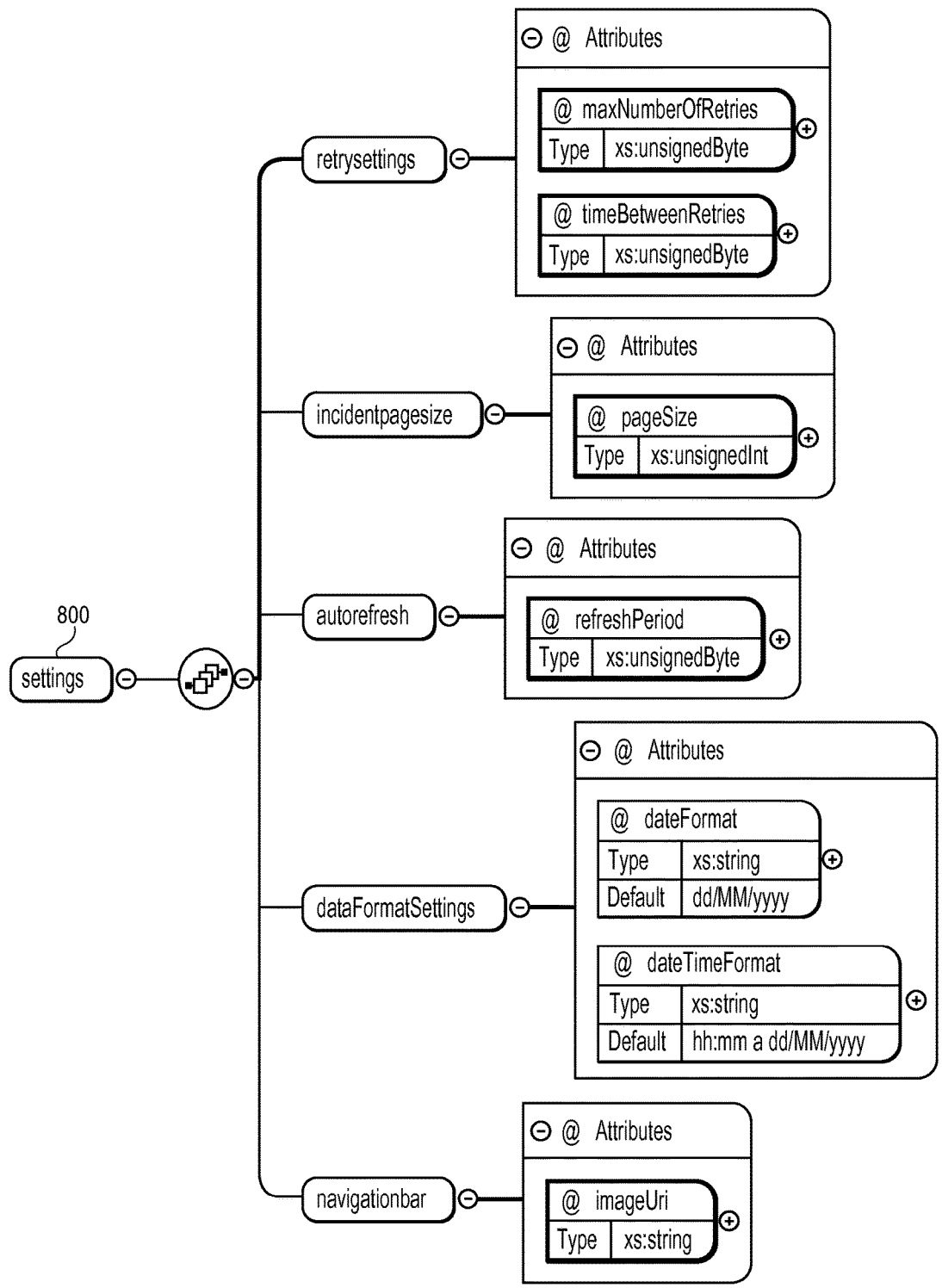
FIG. 8 is an illustration of settings of a manifest type according to an embodiment.

FIG. 8 is an illustration of settings of a manifest type according to an embodiment. In some embodiments, the settings tag contains the various settings for the application. As illustrated, the settings include retry settings, with attributes maximum number of retries and time between retries; incident page size, with attribute page size; autorefresh, with attribute refresh period; data format settings, with attributes data format and date and time format; and navigation bar, with attribute image URI.

For example, attributes may include:

Maximum Number of Retries (Required): The maximum number of times a request is retried. '0' (zero) indicates do not retry. In some embodiments, there may be explicitly no way to define an infinite number of retries in order to protect the system. In an example, any value over 100 may be pegged at 100. In some embodiments, the default is set in the application itself, which may be, in one example, 5 retries.

timeBetweenRetries (Required): The number of milliseconds between retry attempts. Zero (0) indicates to retry immediately. In some embodiments, the default is set in the application itself. In one example, the default is 50 msecs (milliseconds). There is no guarantee that the request will be retried in exactly the time specified and thus this time only indicates when the request re-enters the queue. It will be executed at the next available time in the queue.

Page Size (Required): Number of incidents per page.

Refresh Period (Required): The time at which to automatically poll the services (such as Salesforce services) for new incidents. The time displayed may be in seconds. In a particular example, a minimum of 5 seconds may be used in the event that an invalid refreshPeriod is detected.

Figure 9:
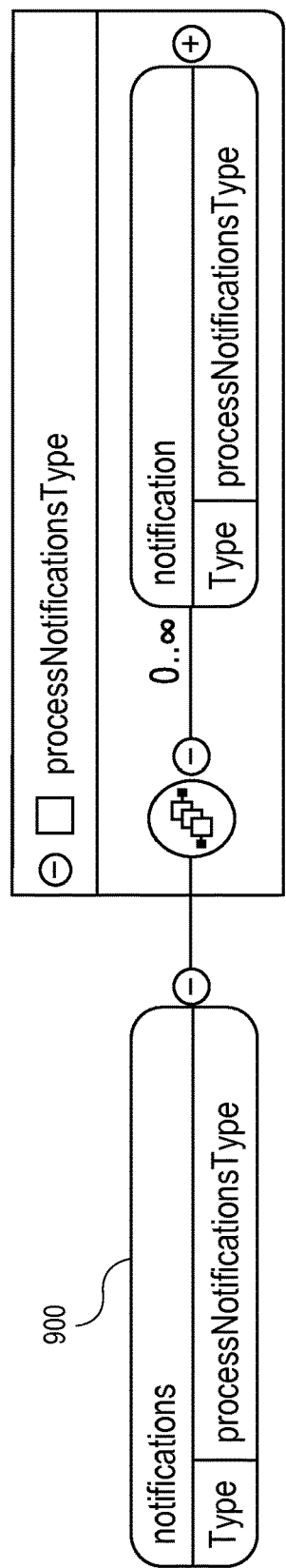
FIG. 9 is an illustration of a process notification according to an embodiment.

FIG. 9 is an illustration of a process notification according to an embodiment. As illustrated in FIG. 9, the process notification 900 includes a process notification type. In some embodiments, process notification routing rules are similar to the application notification routing rules. In some embodiments, an application manifest includes process notification nodes for the routing of messages to processes, where the process notification nodes may include an ordered of process notification nodes.

Below is an example of a process notification:

```
<notifications>
    <notification objectType="Case" recordType="Incident"
event="Sev1" processRef="View Incident" />
    <notification objectType="Case" recordType="RMA"
event="Sev1" processRef="Sev1 RMA" />
    <notification objectType="Case" recordType="RMA"
processRef="View RMA" />
</notifications>
```

In some embodiments, similar to the application routing rules, the process routing rules within a notification node are evaluated by finding the first most specific notification node matching the message passed. In some embodiments, the notification node for a process routing rule behaves in the application routing rules with two differences:

(1) This is a processRef that is required to match an existing Name on a process within the application manifest.

(2) Messages that do not specify an object ID are required to route to a process that has processType set to List. Messages that do specify an object id are required to route to a process that has processType Read or Update. Further, nothing can route to a process of type Search.

Figure 10:
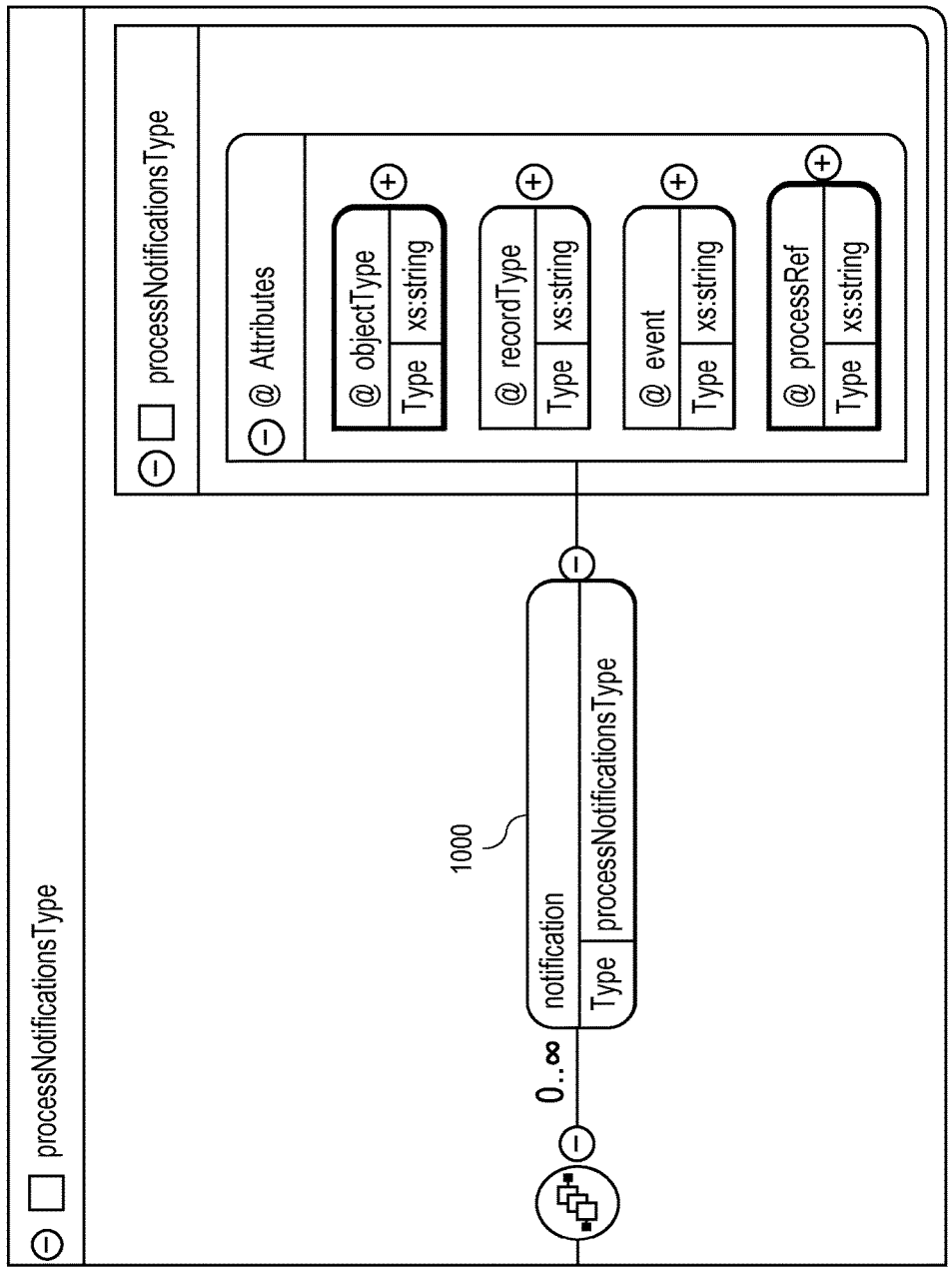
FIG. 10 is an illustration of a process notification node for routing to a process according to an embodiment.

FIG. 10 is an illustration of a process notification node for routing to a process according to an embodiment. As illustrated in FIG. 10, a notification node 1000 (which may also be referred to as a process notification node) includes a process notification type with attributes that may include object type, record type, event, and process ref. In some embodiments, a process for determining which process to route a message is similar or identical to a process for determining which application to route the message. In some embodiments, a message is routed to the first most specific notification node that is matched for process routing.

Figure 11:
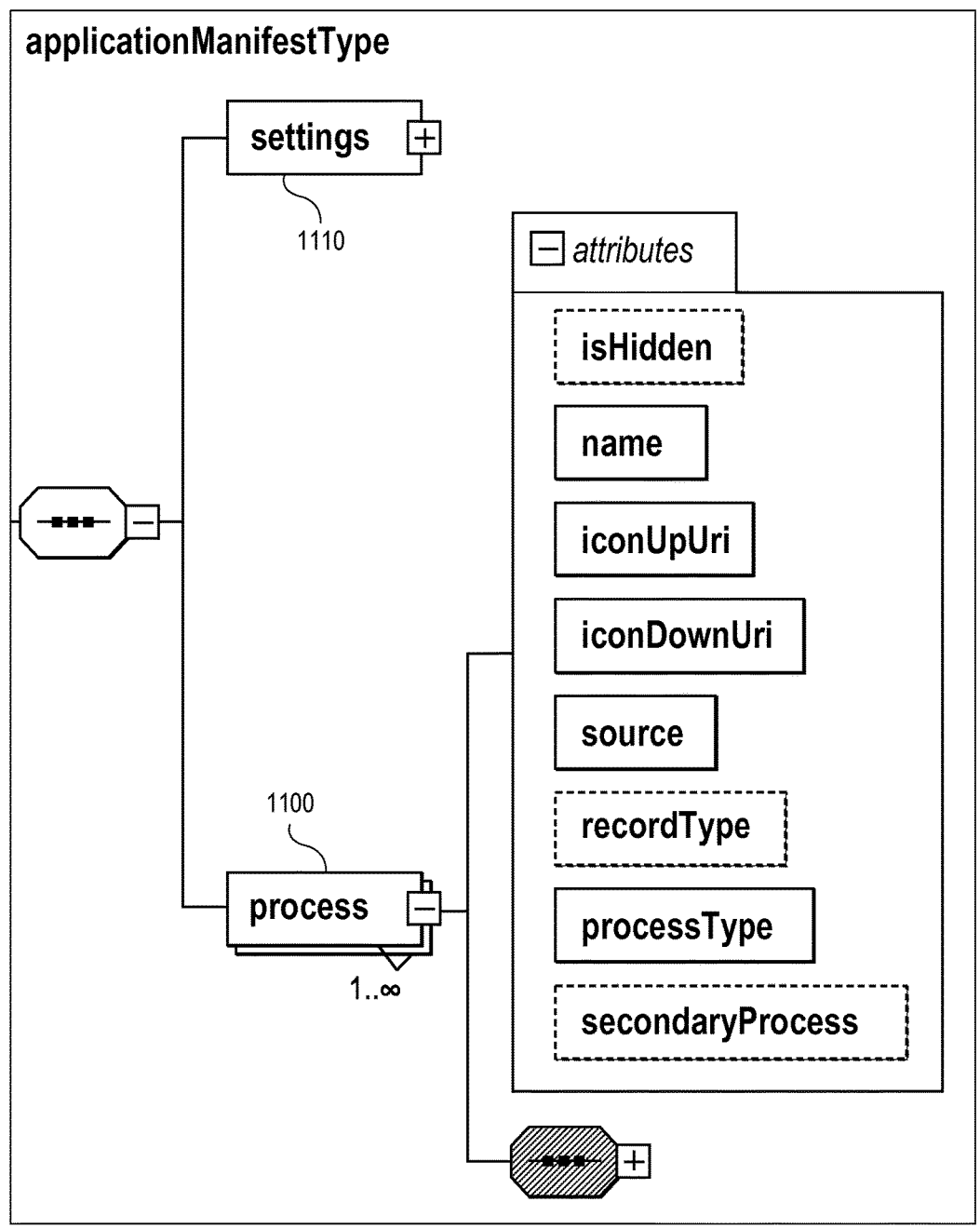
FIG. 11 is an illustration of a process element according to an embodiment.

FIG. 11 is an illustration of a process element according to an embodiment. As illustrated, the application manifest is associated with settings 1110 and one or more processes 1100, wherein each process has one or more attributes.

For example, the attributes of a process may include:

isHidden (Optional): Attribute describes whether the process is hidden or visible in the menu wallet.

name (Required): A human readable name of the process. This attribute is required.

iconUpUri (Required): This attribute is the URI of the icon file in the up (non-depressed) position representing the process. The icon file is always a relative URI rooted in the same folder as the manifest.

iconDownUri (Required): This attribute is the URI of the icon file in the down (depressed) position representing the process. The icon file is always a relative URI rooted in the same folder as the manifest.

source (Required): This attribute corresponds to the type of object to use for all queries and updates.

recordType (Optional): This attribute identifies a record type to use when fetching the metadata for the process. All fields within the process will be fetched using this record type and all items created under this process will use the record type defined. The record type should be the full identifier or the record type API name.

processType (Required): This attribute defines the type of the process. This attribute can be one of the following values: read; create; list; search; or update.

secondaryProcess (Optional): This attribute corresponds to the name attribute of the process a user wishes to access from within the current process (e.g. access "Change" process from a "Verify" process). In some embodiments, the only process transition supported is from process type "read" to access a secondary process of process type "update".

secondaryProcessName (Optional): This attribute represents the human readable button label of the secondary process. If this attribute is omitted, the secondaryProcess value is used. This attribute exists because in some embodiments the process names are required to be unique and if a user wanted to call two process names "Edit" because that's what the user wanted on the button for two different object types, this would not be possible.

sortField (Optional): This attribute controls what field should be used when sorting the result items. Please note that sort order for the specified sort field is generally descending, but embodiments are not limited to any particular sort order.

Figure 12:
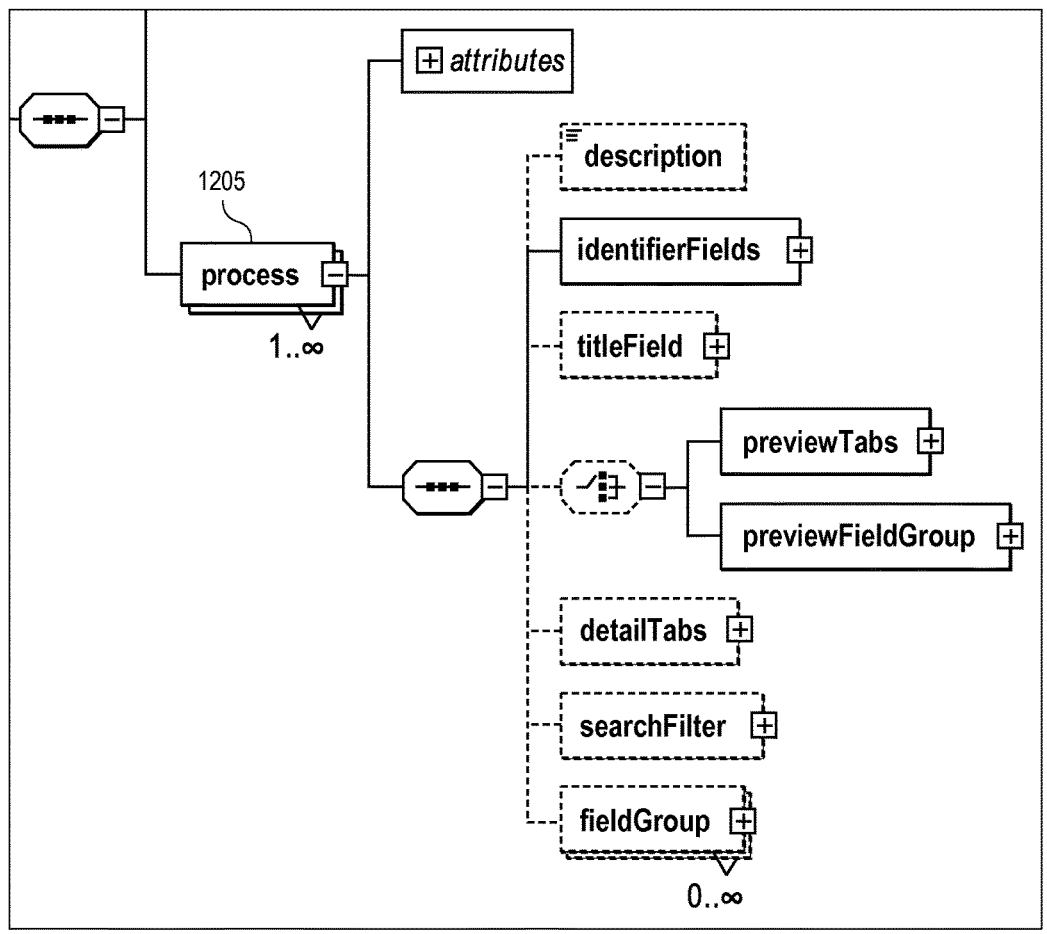
FIG. 12 is an illustration of child elements for a process according to an embodiment.

FIG. 12 is an illustration of child elements for a process according to an embodiment. As illustrated in FIG. 12, a process 1200 may include attributes, with child elements being one or more of a description; identifier fields; title field; preview tables; preview field group; detail tables; search filter; and field group.

Figure 13:
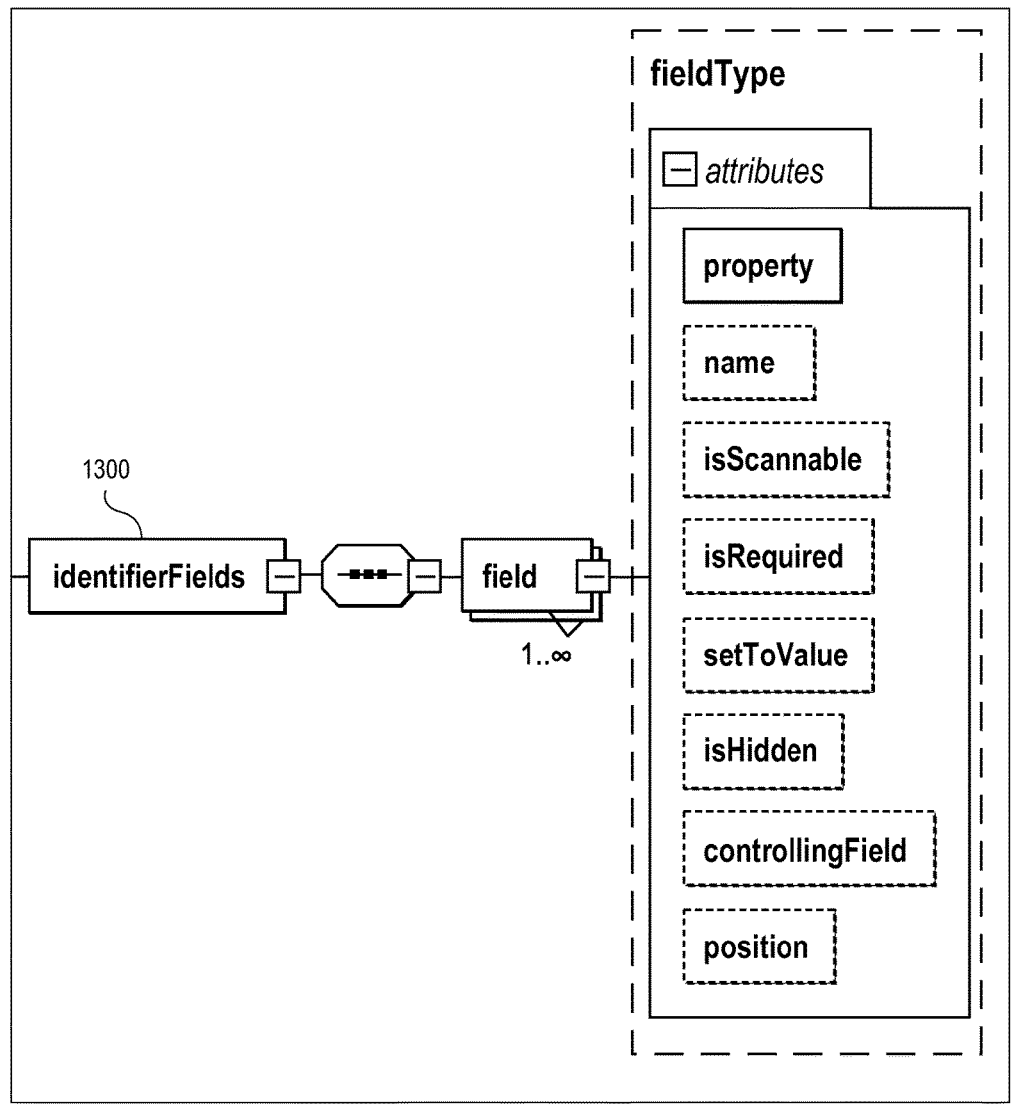
FIG. 13 is an illustration of an identifier fields element according to an embodiment.

FIG. 13 is an illustration of an identifier fields element according to an embodiment. As illustrated in FIG. 13, a field element of an identifier fields (identifierFields) element 1300 of a process may include attributes. In some embodiments, the identifier fields element represents a list of possible identifiers for the incident, wherein it is required that at least one field is defined. In some embodiments, exactly one set of fields can be used to identify the asset for the process, wherein the set of fields includes one or more fields. The fields are of type fieldType, as illustrated in, for example, FIG. 19. In some embodiments, the attributes of a field element may include property; name; isScannable; isRequired; setToValue; isHidden; controllingField; and position.

Figure 14:
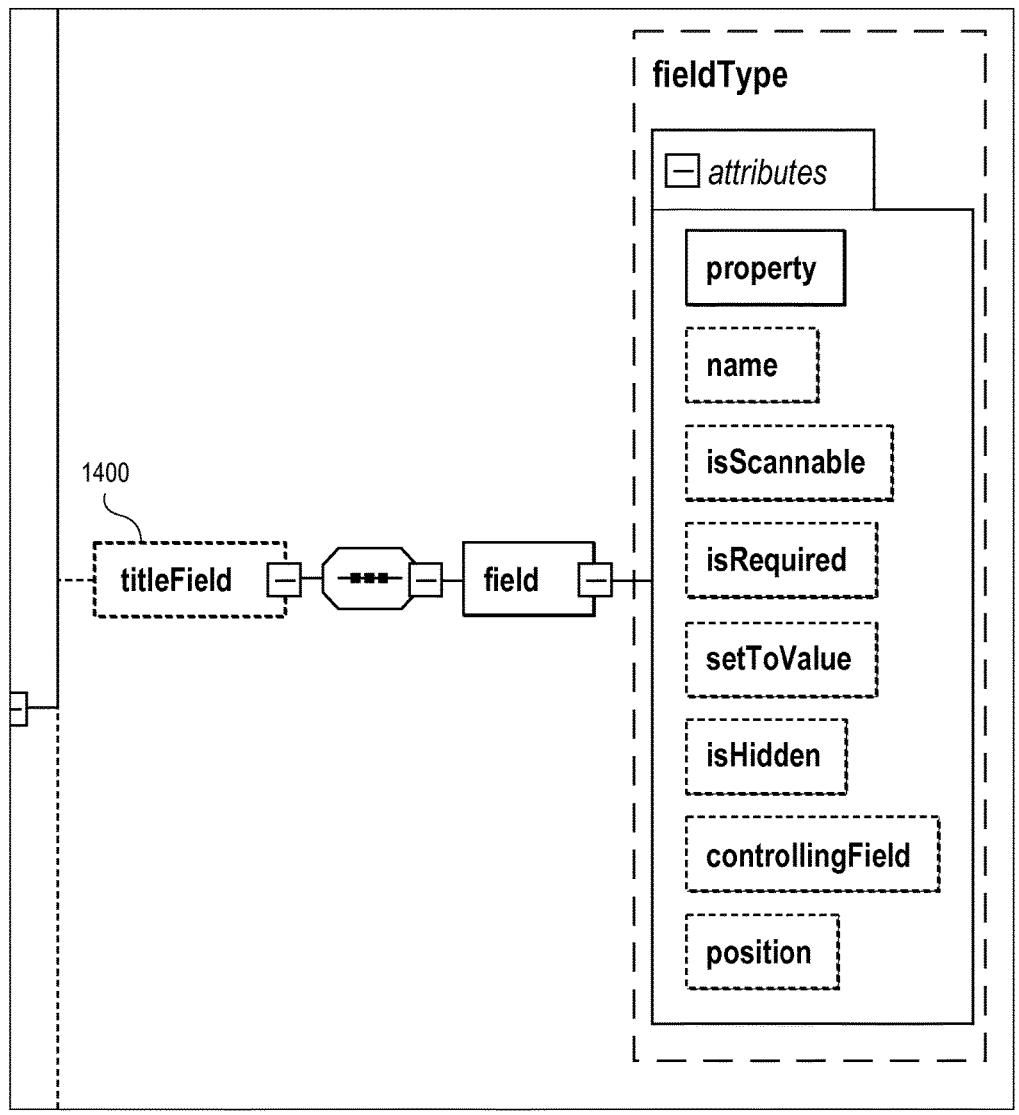
FIG. 14 is an illustration of a title field element according to an embodiment.

FIG. 14 is an illustration of a title field element according to an embodiment. As illustrated in FIG. 14, a title field (titleField) element 1400 of the identifier fields of a process may include a field, wherein the field may include attributes. In one embodiment, the title field element contains a single field element whose value will be displayed in the top navigation bar of the incident details screen. The single field that will be used the set the title for the process details view. In some embodiments, the attributes may include property; name; isScannable; isRequired; setToValue; isHidden; controllingField; and position.

Figure 15:
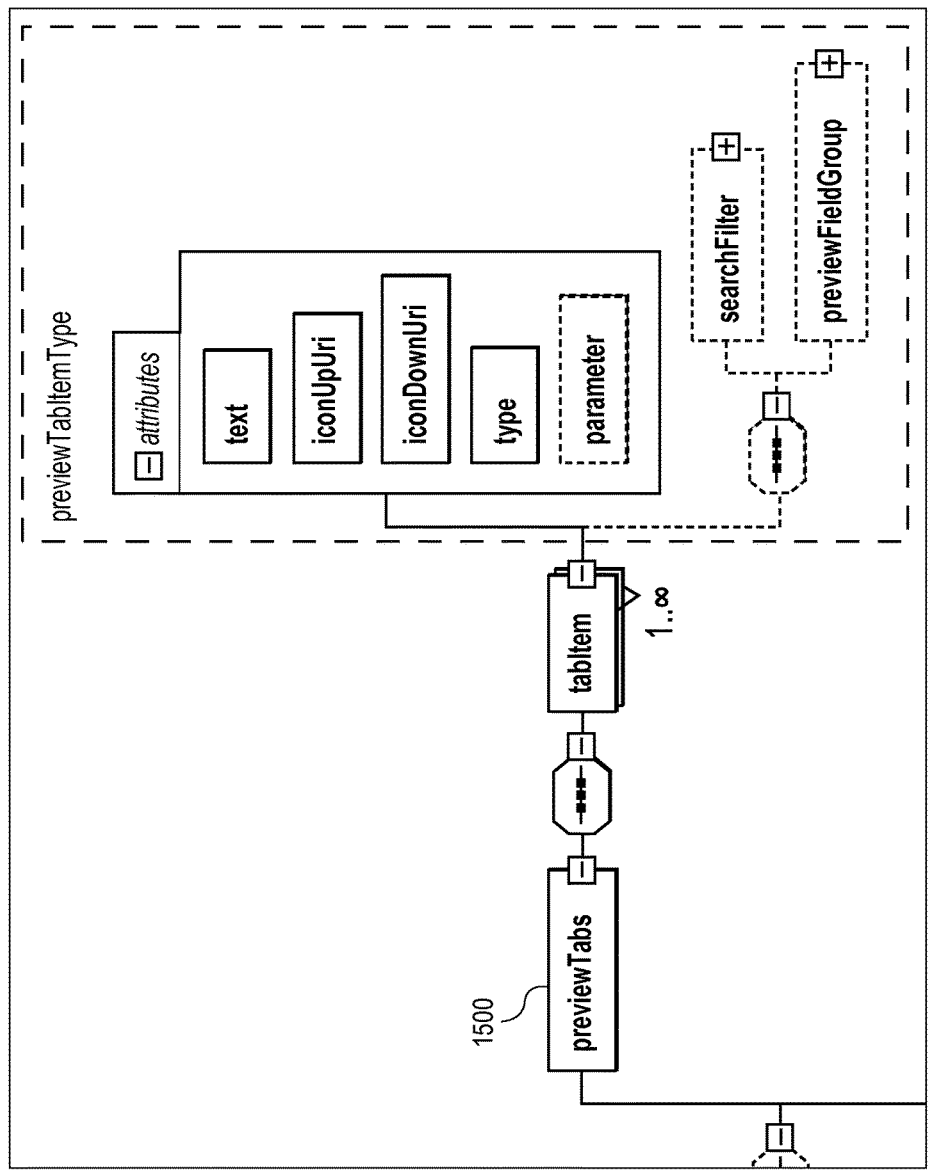
FIG. 15 is an illustration of a preview tables element according to an embodiment.

FIG. 15 is an illustration of a preview tables element according to an embodiment. As illustrated in FIG. 15, a preview tables (previewTabs) element 1500 of the identifier fields of a process includes one or more table items (tabItems), wherein the table items may include attributes, as well a search filter (searchFilter) and preview field groups (previewField). In one embodiment, the preview tables element represents a field grouping within the tab item. This field grouping denotes the fields on the source object for the current process that will be used when rendering the Incident list view. Also note that this element can only be specified for a tabItem defined within a previewTab element.

In one embodiment, the tab item element contains a series of tabItem elements that will appear in the bottom tab bar in the incident list view. In one embodiment, the position of the tab bar buttons is drive by the tabItem type. If a manifest administrator defines multiple tabItem elements with the same type, they will appear in the same physical location on the tab bar in a carousel fashion (i.e., pressing a tab bar button will remove it from the top of the queue and add it to the end of the queue, displaying the next tabItem on screen).

In one embodiment, one set of previewTabs will be used to enable (or disable) buttons on the bottom tab bar. More specifically, this element will contain a series of tabItems that will control the visibility of buttons that will appear in the tar bar presented on the incident list view page. This element may be to enable or disable tab bar buttons on screen.

For example, the attributes of tabItems may be as follows:

text (Required) This attribute provides text to be used as the button name. In some embodiments, the text will appear directly below the button image on screen.

iconUpUri (Required) This attribute is the icon to use while the button is in the up (non-depressed) position. Please note that this URI is a relative path to the icon.

iconDownUri (Required) This attribute is the icon to use while the button is in a down (depressed) position. Please note that the URI is a relative path to the icon.

type (Required) The value of this attribute indicates the type of tabItem this will represent. In some embodiments, there is a finite set of supported types. Each type performs a preconfigured action. In an example, the supported tabItem types are:

(a) query
(b) dial
(c) refresh

In some embodiments, when type is set to dial the parameter attribute is required to be set. The format expected for the parameter attribute should take the following form: [<conference bridge number field>],,[<dial in number field>]. In some embodiments, it is the responsibility of the system administrators to include any required international codes for the conference bridge number when setting the field value through the existing SupportForce web application. In some embodiments, an implementation leverages built in iPhone capabilities provided by the Phone application. In some embodiments, when the conference bridge number is rendered on screen the UITextView will automatically parse the string value and invoke the built in Phone app (using the string value as input arguments).

In some embodiments, when type is set to query, the tab item can contain a searchFilter child element. This will serve as the query to issue when the tab bar item is selected by the user. In some embodiments, if the tabItem is defined within a process with type Search, the searchFilter element should not be defined. The first query tab item serves as the query used to determine the count badge displayed for that process on the main application screen.

In some embodiments, when type is set to refresh the application will re-issue the last known request.

parameter (Optional) In some embodiments, this attribute can only be used with a tabItem of type dial. In some embodiments, this attribute is used to define the fields that should be concatenated for the one-touch dial feature.

Figure 16:
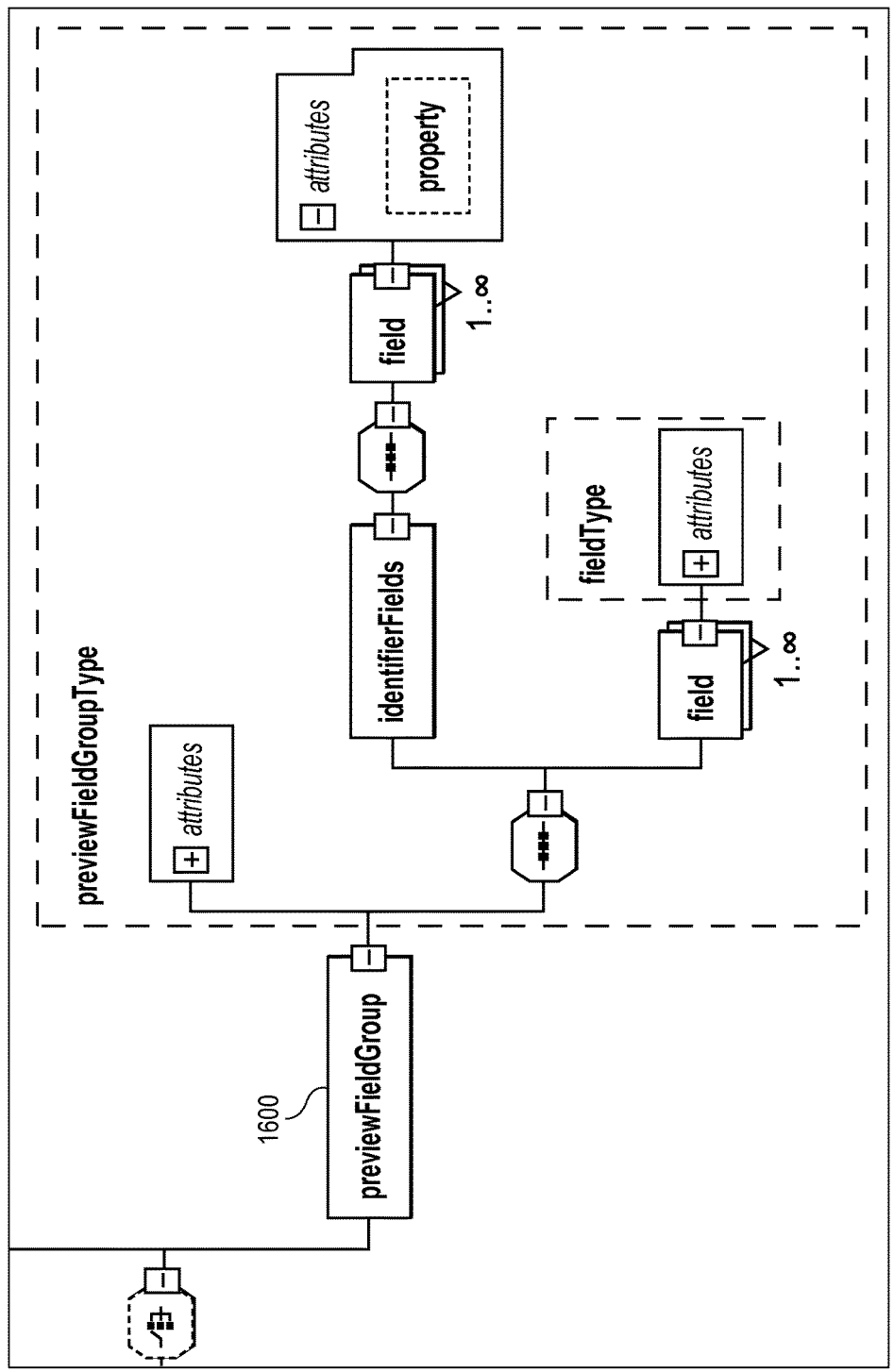
FIG. 16 is an illustration of a preview field group according to an embodiment.

FIG. 16 is an illustration of a preview field group according to an embodiment. As illustrated in FIG. 16, a preview field group (previewFieldGroup) element 1600 includes a preview field group type. In one embodiment, the preview field group element represents a field grouping within the application. This field grouping denotes the fields on the Incident object that will be used when rendering the Incident list view.

Figure 17:
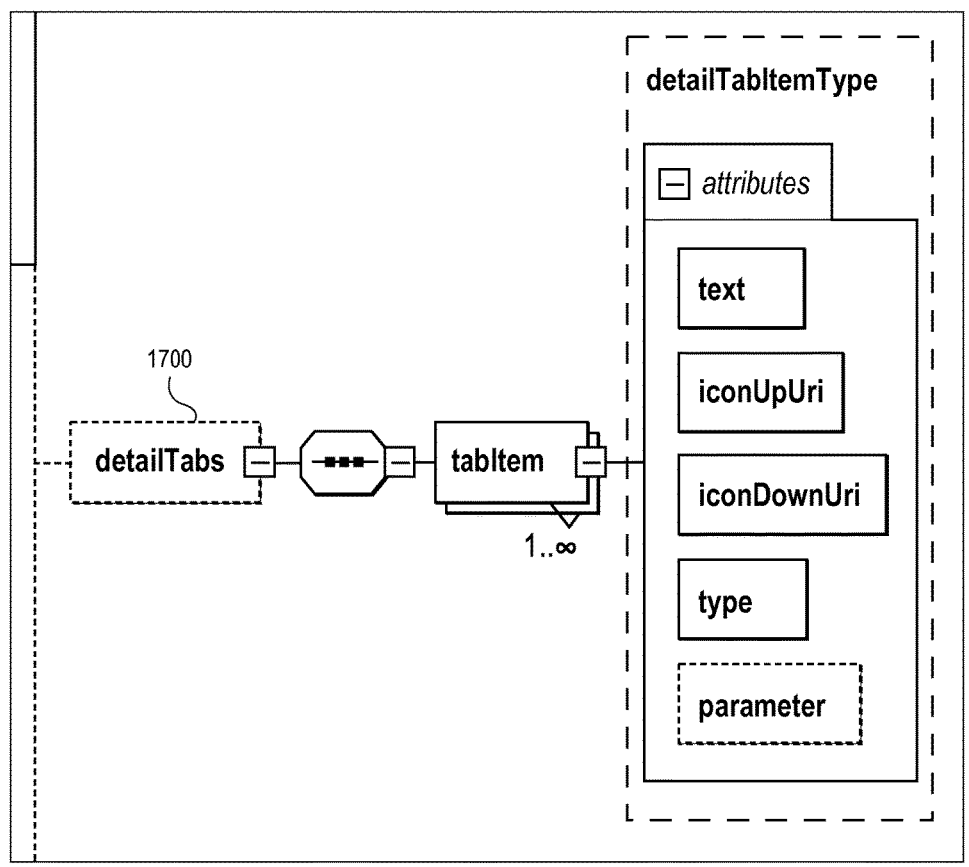
FIG. 17 is an illustration of a detail tables element according to an embodiment.

FIG. 17 is an illustration of a detail tables element according to an embodiment. As illustrated in FIG. 17, a detail tables (detailTabs) element 1700 includes one or more table items (tabItem), which may include certain attributes.

In one embodiment, the detail tab element contains a series of table item (tabItem) elements to display in the incident details page. In some embodiments, the position of these tabItems is not dynamic. Instead, the location is determined based on the tabItem type. If a manifest administrator defines multiple tabItem elements with the same type, the application will take the first tabItem with the duplicated type.

In one embodiment, one set of detailTabs can be defined within a process. The element will contain a series of tabItems that will enable (or disable) tab bar buttons on the incident details page.

Figure 18:
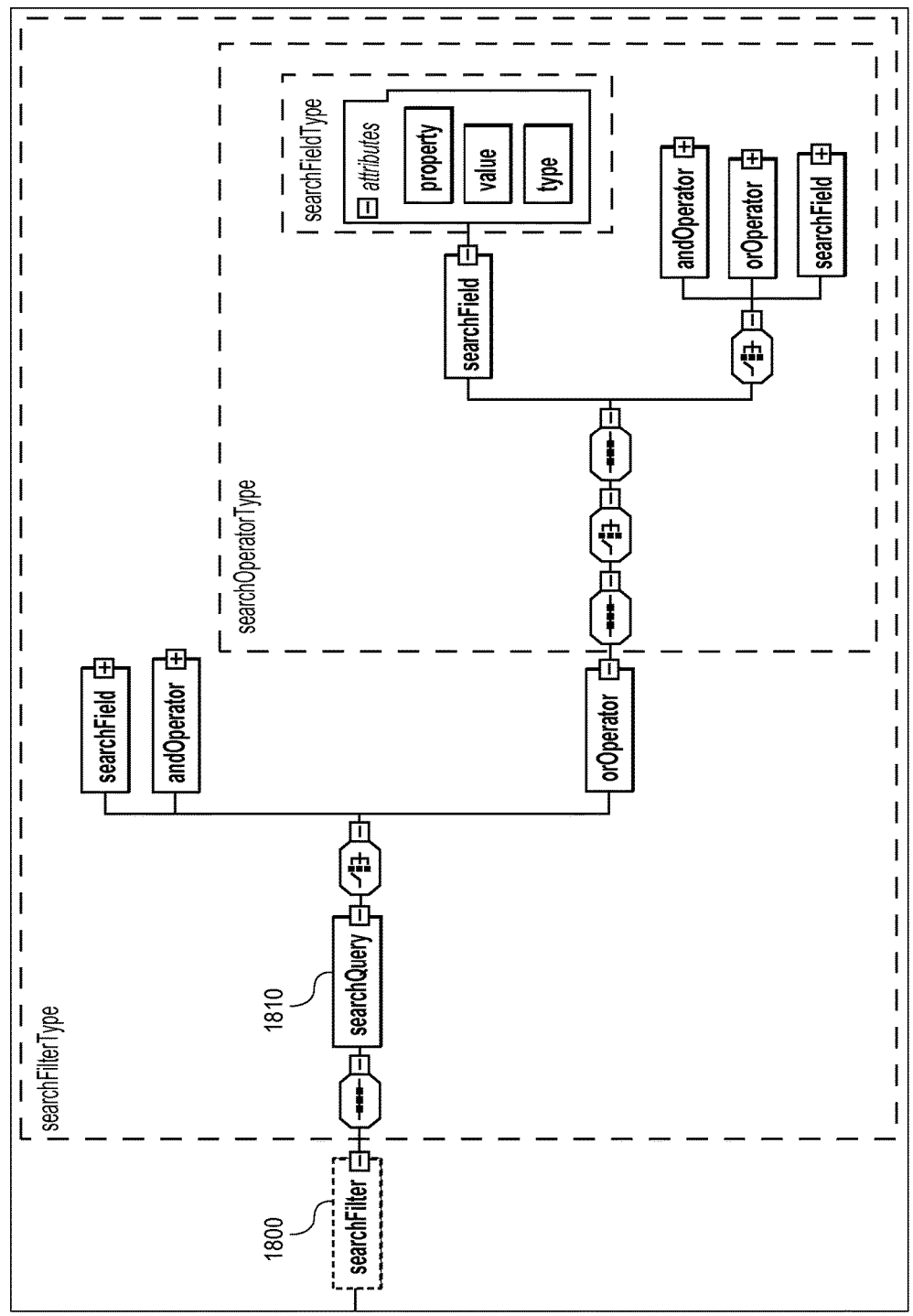
FIG. 18 is an illustration of a search filter element according to an embodiment.

FIG. 18 is an illustration of a search filter element according to an embodiment. As illustrated in FIG. 18, a search filter element 1800 may address a search query 1810. The search query 1810 may include a search field and an AND operator or an OR operator, with FIG. 18 illustrating the expanded OR operator to illustrate the search operator type with search field having a search field type, and which may further include AND and OR operators and additional search field. In one embodiment, the search filter element represents a means of capturing the search criteria for the current process, which provides administrators the opportunity to specify what type of filtering is required to be applied without having to modify the project source. In one embodiment, one set of query operations can be defined directly on the process element. This will serve as the default query to issue when the process has been loaded on screen.

Figure 19:
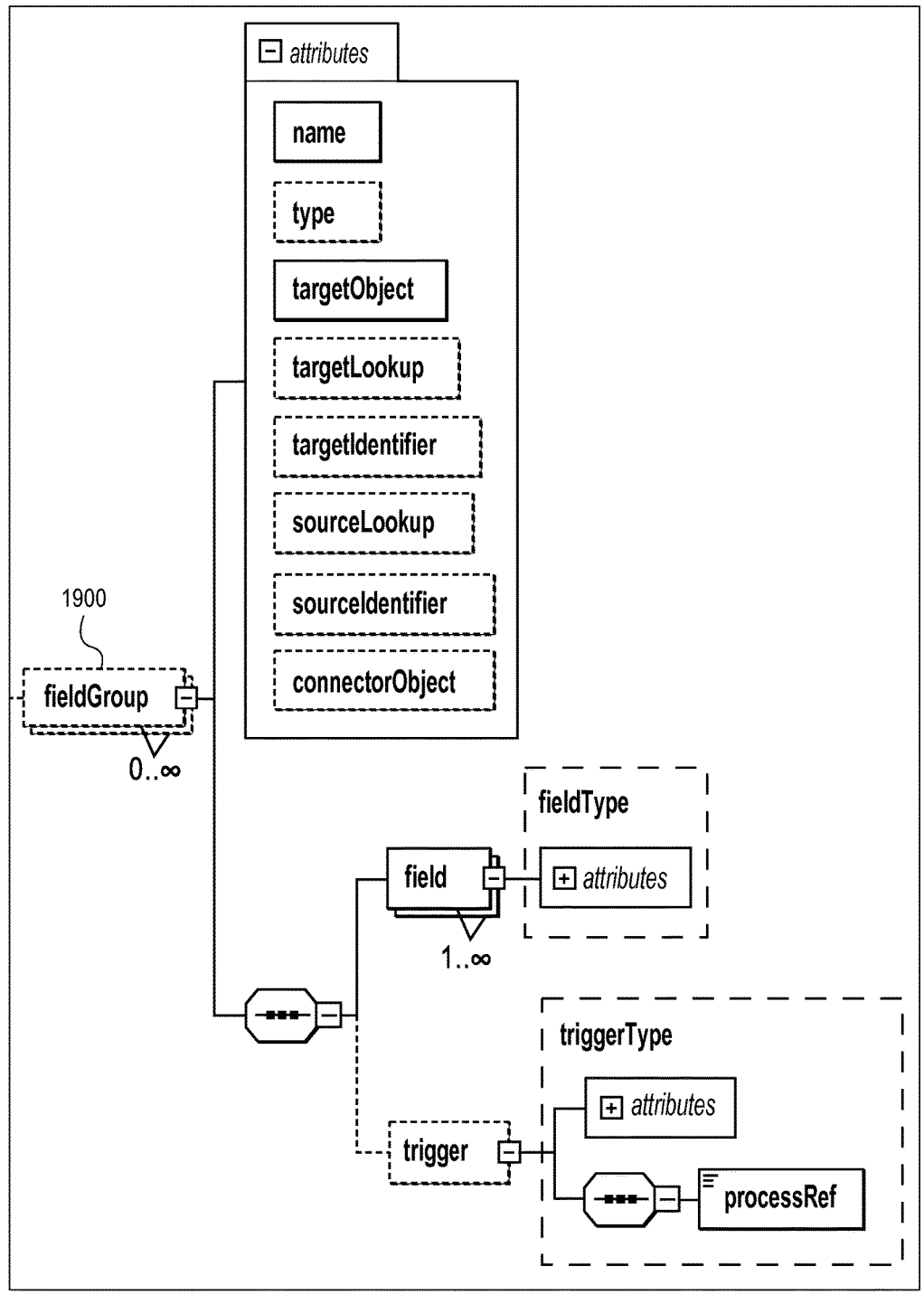
FIG. 19 is an illustration of a field group element according to an embodiment.

FIG. 19 is an illustration of a field group element according to an embodiment. As provided in FIG. 19, each of one or more field groups 1900 within an application includes a set of attributes and one or more fields, each field having a field type with one or more attributes. In some embodiments, the field group may include a trigger to trigger a process, wherein the trigger includes a trigger type with one or more attributes and a process reference.

In one embodiment, the field group element represents a field grouping within the application. This is interpreted differently depending on the process type. For read processes this represents a grouping within the screen. For create and update processes this represents pages. In one embodiment, zero or more field groups that make up that process. Field groups can be turned into pages or groupings in the mobile application. The order of the fields groups is the order in which they will appear in the application.

In some embodiments, schema data types include the following field type attributes (represents a reference to a Force.com property):

property (Required): The exact API name of the Force.com object property this field references. This attribute is required.
name (Optional)
isScannable (Optional)
isRequired (Optional): true if the field is required; false otherwise. This is an optional field that defaults to false if not provided. In some embodiments, this is used to enforce required fields on a handheld device.
setToValue (Optional): This field is used to set the field to the value specified when the process starts for that item. This is used for processes like "Dispose" where all the process does is set the status to a specific value. If setToValue is present on any field in a process that has a processType="Read" then an update will be sent with the value every time that process is run on the client.
isHidden (Optional) true if the field is required: false otherwise. This is an optional field that defaults to false if not provided. In some embodiments, the value is used to determine whether or not to display the field and its value in the UI. This field can be used in conjunction with setToValue in order to set process wide defaults. The user will not be able to change this value since it will not be displayed anywhere in the client application.
controllerField (Optional) This is an optional field used to indicate that the values of the field it appears on are dependent on the attribute value. For example, if controllingField="Bar" on a field where property=:Food" then the value of Foo are dependent on the selected value in Bar. This is only necessary on fields that are not dependent picklists. Fields that are dependent picklists already have this information in their metadata and the application will use that instead. Restrictions:
  The field is required to be a reference field;
  The field is prohibited from being a dependent picklist (that information is already stored in the field metadata for dependent picklists);
  The controlling field is required to be a reference field on the same reference object.
  The controlling field should only be the reference field name and not the full object.field name. For example if we have reference object Asset_Type_c with a field named Model_c that depends on another field named Make_c then the field definition might look like this:
  <field property="Asset_Type_c.Model_c" controllingField="Make_c"/>
position (Optional): This attribute is used by list and search views to set in which part of the list view item view this field should appear. Values of the attribute may, for example, be one of the following:
  1=The main title of the list item;
  2=The smaller text below the title;
  3=The tiny value on the top right of the list item.
displayProperty (Optional) This attribute is only relevant when the property is a relationship. For example "Owner" or "Parent" on the Case object. The attribute specifies which property on the related object to display when displaying this row for the parent object. For example, if a user wanted to display the case number of the Parent Case in the current Case, the user may utilize the following:
  <field property="Parent" displayProperty="CaseNumber"/>
If this attribute is omitted on a relationship field the Id of the related object is displayed by default.
displayProcessRef (Optional) This attribute determines the process or processes to navigate to when this relationship is tapped. In some embodiments, the value is required to match the name of any process defined elsewhere in this manifest. This can be the current process if the related object is of the same type. The source of the target process is required to be of the same type as the related object. For example, if a user wanted to navigate to the "Case Details" process when the parent case is tapped the user would do the following:
  <field property="Parent" displayProperty="CaseNumber" displayProcessRef="Case Details"/>
Polymorphic relationships: Salesforce includes the concept of polymorphic relationships where a relationship can refer to more than one type of object. The Owner field of Case is one such example. The Owner field can either be a User or a Group. In order to manage this a user can supply more than one process name separated by commas to specify which process to navigate to when the item is tapped. The same rules apply and the source object types are required to match each of the possible polymorphic types. For example the Owner field on Case could be defined as follows:
  <field property="Owner" displayProperty="Name" displayProcessRef="User Details, Group Details"/>
    Where "User Details" is a process for the User object and "Group Details" is a process for the Group object.

If this attribute is not defined then the field will be treated like a text field and the user will be navigated to a text view of the related property. If the value of the property is nil: no navigation will occur.

Figure 20:
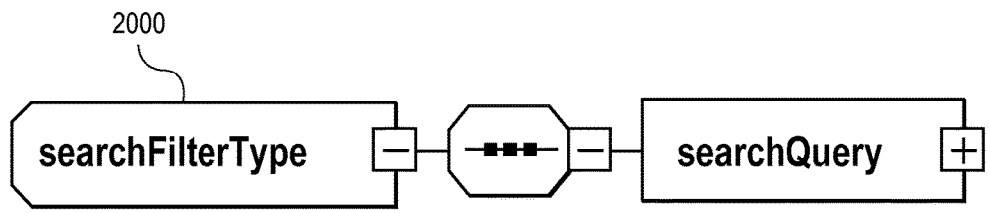
FIG. 20 is an illustration of a search filter element type according to an embodiment.

FIG. 20 is an illustration of a search filter element type according to an embodiment. As illustrated a search filter type 2000 is associated with a search query. In some embodiments, a search filter type represents a data type that performs a query on, for example, the Force server in a Salesforce implementation.

Figure 21:
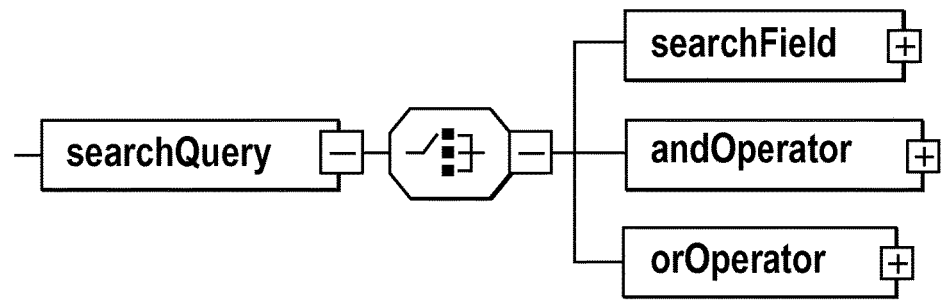
FIG. 21 is an illustration of a search query element according to an embodiment.
Figure 22:
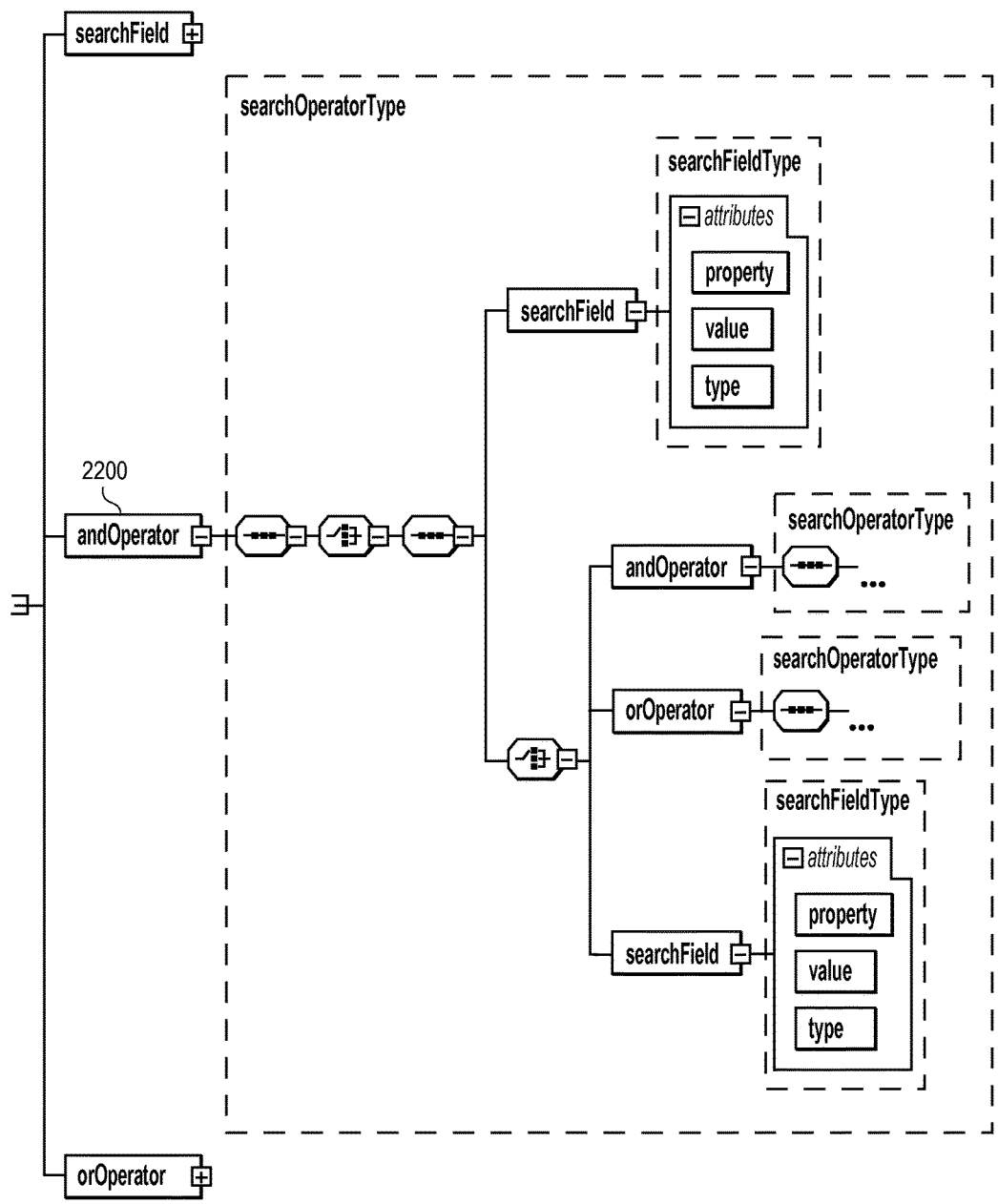
FIG. 22 is an illustration of an AND operator according to an embodiment.
Figure 23:
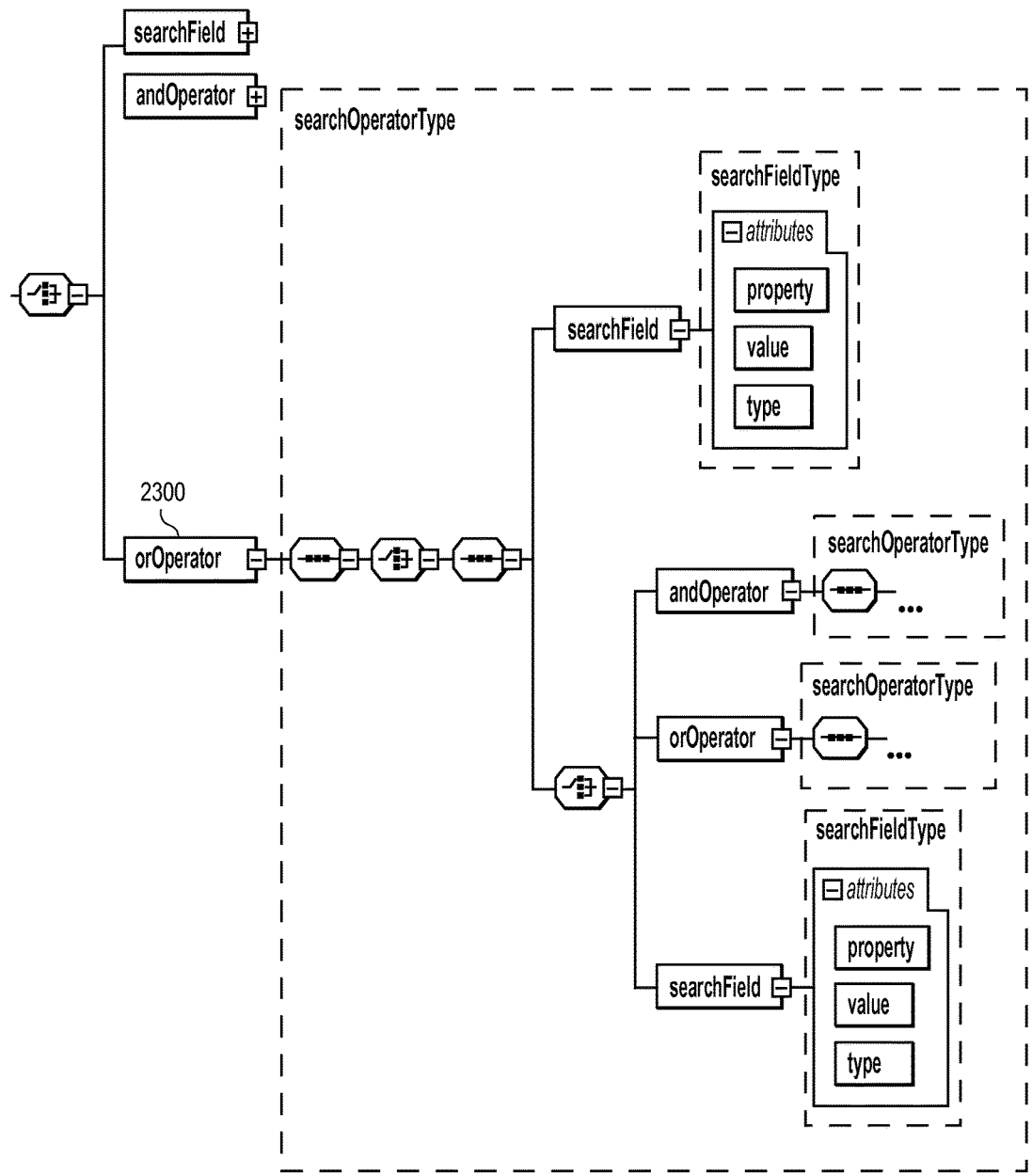
FIG. 23 is an illustration of an illustration of an OR operator according to an embodiment.

FIG. 21 is an illustration of a search query element according to an embodiment. In some embodiments, the search query 2100 consists of one of the following XML elements: searchField; andOperator; or orOperator. FIG. 22 is an illustration of an AND operator 2200 according to an embodiment, and FIG. 23 is an illustration of an illustration of an OR operator 2300 according to an embodiment. For each of the AND and OR operator, there is a search field with attributes property, value, and type, and may further include a further AND operator, OR operator, and search field.

Figure 24:
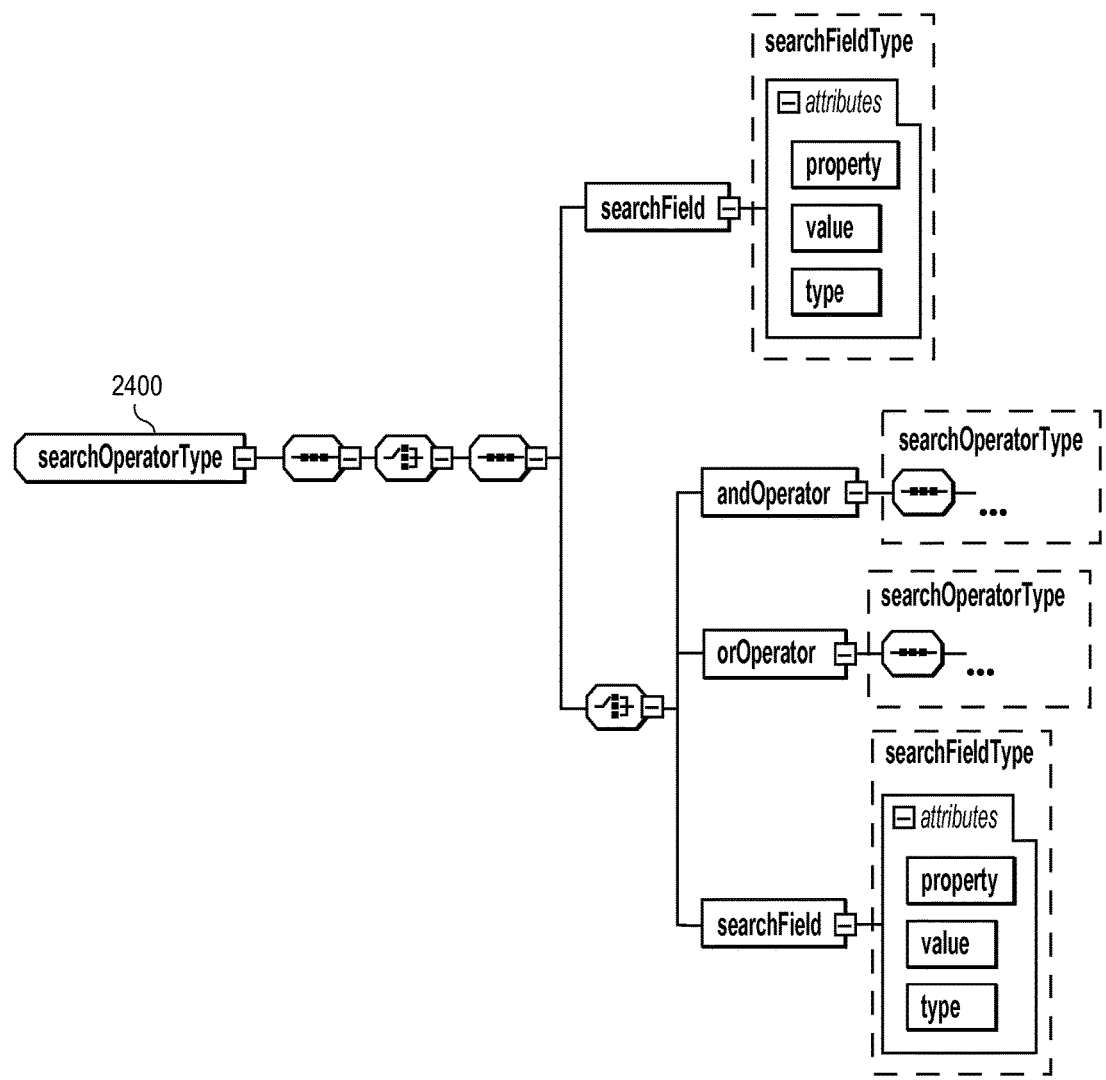
FIG. 24 is an illustration of a search operator type according to an embodiment.

FIG. 24 is an illustration of a search operator type according to an embodiment. In some embodiments, the search operator type 2400 is an element type that represents a field to be used for incident list queries. In some embodiments, the value attribute defined on this element can be tokenized. For example, the following tokens may be recognized:

[Me]
1. When the manifest parser sees this value it will be replaced with the user id for the current user. This feature was created to allow a manifest administrator to create processes capable of returning items assigned to the current user.

[MyQueues]
2. When the manifest parser sees this value it will perform a search based on all the queues the current user is assigned to. Note that to use this feature, the user will need to specify "IN" as the operator.

In some embodiments, the following elements are utilized:

And Operator: An element that will be used to support logical AND operations. Note that andOperations can be nested.

Or Operator: An element that will be used to support logical OR operations.

Search Field Type: This element type represents the field to be used for incident list queries.

In some embodiments, the search field type may include the following attributes:

property (Required): The exact API name of the Force.com object property this field references. This attribute is required.

value (Required): The expected value from, for example, a Force.com object property. As mention in the SearchField general description, this attribute can be tokenized. In one implementation, this is the only supported token in [Me]. If a user specifies this value, the value will be replaced with the user id of the current user during execution.

type (Required): The type of value.

Operator (Optional) The operator to use when performing a search. This value can be any of the SOQL (Salesforce Object Query Language) supported operators (i.e. '=', '<', '>', 'IN', etc.)

Figure 25:
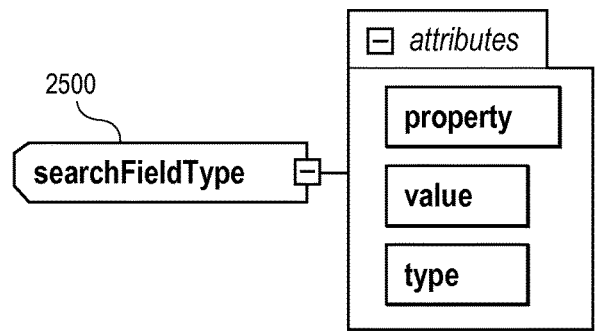
FIG. 25 is an illustration of a preview field group type according to an embodiment.

FIG. 25 is an illustration of a preview field group type according to an embodiment. As illustrated, the preview field group type (previewFieldGroupType) 2500 includes attributes, such as an accessory image Uri, identifier fields, and one or more fields with attributes.

Figure 26:
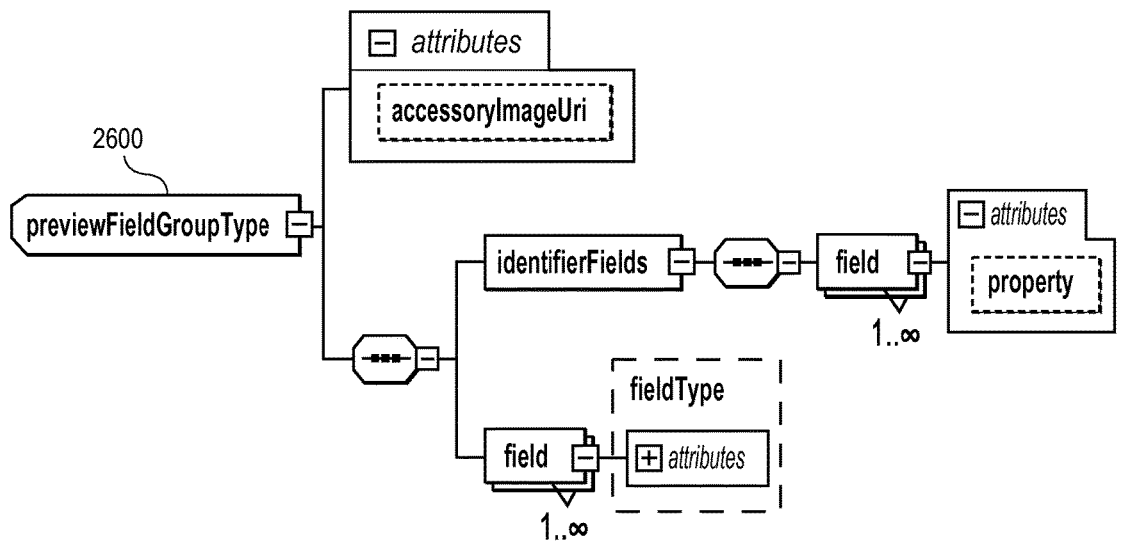
FIG. 26 is an illustration of a preview table item type according to an embodiment.

FIG. 26 is an illustration of a preview table item type according to an embodiment. As illustrated, the preview table item type (previewTabItem Type) 2600 includes attributes, such as text, icon up Uri, Icon down Uri, type, and parameter, and may include a search filter and a preview field group.

Figure 27:
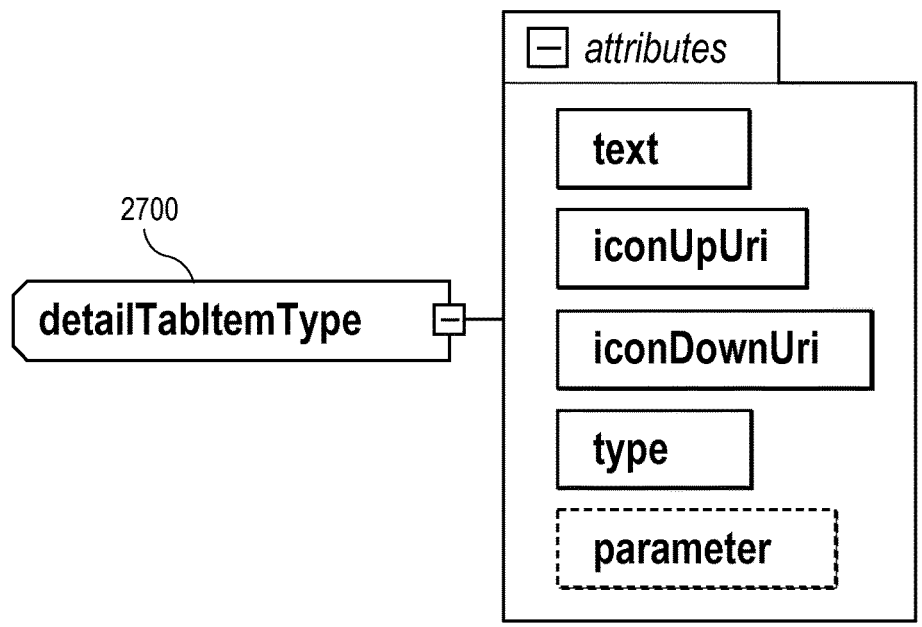
FIG. 27 is an illustration of a detail table item type according to an embodiment.

FIG. 27 is an illustration of a detail table item type according to an embodiment. As illustrated, the detail table item type (detailTabItem Type) 2700 includes attributes, such as text, icon up URI, icon down URI, type, and parameter.

Figure 28:
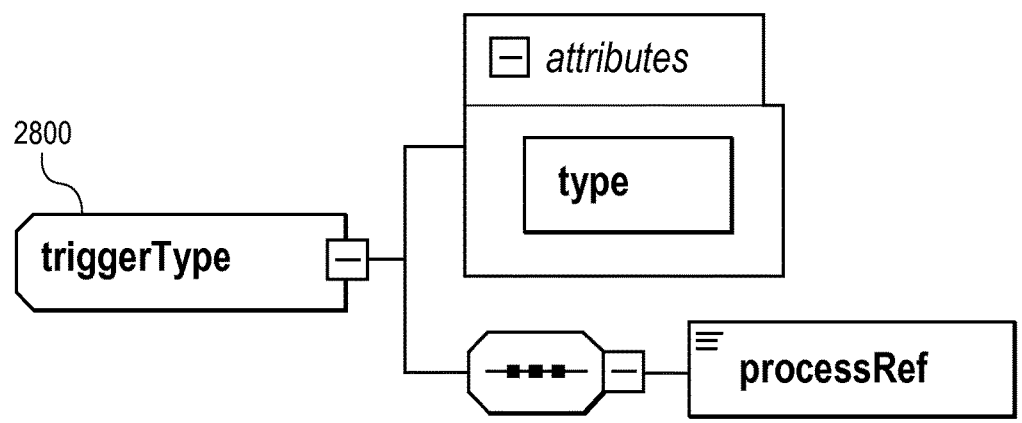
FIG. 28 is an illustration of a trigger type according to an embodiment.

FIG. 28 is an illustration of a trigger type according to an embodiment. As illustrated, the trigger type (triggerType) 2800 includes attributes, such as type, and a process reference. In some embodiments, a trigger type may include a selected type.

In some embodiments, a process type may include: Search, Read, Update, Create, and Dispose.

In some embodiments, a field group type may include:

Search: When the manifest administrator has defined a process of type Search, the process is required to contain exactly one fieldGroup with type of Search. This field group is used to define the search filters an end user can interact with.

ReleatedLists: This field group type is required to be specified for all fieldGroup elements that will be used for related list queries. In some embodiments, if the manifest administrator does not specify a field group type equal to RelatedList, any and all field group attributes defined will be invalid.

In some embodiments, a detail tab item type may be: Phone; or Reload.

In some embodiments, in addition to the manifest schema described above, a series of enhancements will be performed to support related list functionality. Provided below is a sample fieldGroup that will support many to many related list relationships. This new fieldGroup definition will be used when viewing object details on screen:

```
<fieldGroup
    name="Incidents"
    type="RelatedList"
    connectorObject="Incident_Asset_Connector_c"
    lookUpField="Tech_Asset_c"
    queryField="Incident_Report_Record_c"
    source="Incident_c">
    <field property="Id" isHidden="true" />
        <field property="Name"/>
        <field property="Description_c"/>
        <trigger name="Selected">
            <processRef id="IncidentDetails">
                <parameter
                    name="IncidentId"
                    fieldName="Id"
                    fieldValue="[Id]"/>
            </processRef>
        </trigger>
</fieldGroup>
``` fieldGroup: In some embodiments, field groups can be turned into pages or groupings in the mobile application. The order of the fields groups is the order in which they will appear in the application. Please note that the following attribute call only be defined on a fieldGroup with a process of type Read.

In some embodiments, the attributes of field groups may include:

type: Setting this attribute to 'RelatedList' will inform MakeMobile to treat this group as a related list of items.

connectorObject: This attribute is set to the connector object used to maintain the 'many to many' relationship between the process source object and the fieldGroup source object.

queryField: This attribute is set to a field defined on the connectorObject. This field will be returned in the response issued against the connectorObject.

lookupField: This attribute is to be set the field on the connectorObject, which should be used as the unique identifier. The lookupField is a field defined on the connectorObject that will store the unique Id of the current object on screen. When a 'RelatedList' fieldGroup is defined (representing a 'many to many' relationship) two requests are issued. The first request takes the 'Id' of the current object on screen and queries it against the connectorObject.

source: This attribute will serve as the source object to all fields defined within the related list field group.

In some embodiments, the child elements of field groups may include:

field (1..*): A reference to a SupportForce object.

trigger(1): An action to perform when user interaction is detected within the current fieldGroup. In some embodiments, exactly one trigger can be defined.

Trigger: In some embodiments, a trigger can be defined on a field group. Triggers let the application manifest define what actions should be performed at runtime. In an example, only one trigger operation may be supported (selected). This action will be invoked when the user selects the related item.

In some embodiments, the attributes of triggers may include:

name: The type of trigger to perform at runtime.

In some embodiments, the child elements of triggers may include:

processRef (1): Exactly one processRef element can be defined. In some embodiments, this element may be used to reference a process already defined within the manifest.

ProcessRef: In some embodiments, the ProcessRef element will point to an existing process within the manifest.

In some embodiments, the attributes of the ProcessRef element may include:

id: The name of the process to invoke.

In some embodiments, the child elements of the ProcessRef element may include:

parameter (1): In some embodiments, exactly one parameter element can be defined. This element may be used to pass data into the target process. If this element is missing, an object Id will be passed to the target process by default.

Parameter: In some embodiments, the parameter element is used to pass data into the target process. In example, all of the following attributes may be required to be set in order for the parameter element to work.

In some embodiments, the attributes of the parameter element may include:

name: A human readable unique identifier.

fieldname: In some embodiments, the SupportForce field name or other field name is to reference on the source object of the target process.

fieldValue: In some embodiments, this attribute is required if fieldName is defined. The value can be set as a string literal value (e.g. 7) or a token (e.g. [<Salesforce field name>]). When specified as a token the value will be used to reference the SupportForcefieldName specified in the source attribute.

In some embodiments, the parameter element does not include child elements.

In some embodiments, due to the nature of related lists, it may be determined to only present summary information on screen. In some embodiments, only a limited number of field elements, such as the first two 2 visible field elements (i.e. isHidden=false), will be selected and rendered on screen.

In an example, the following is a manifest sample:

```
<process name="Verify" type="Read" source="Tech_Asset_c" ...>
    <fieldGroup name="General">
        <field property="Name"/>
        <field property="Status_c" />
        <field property="Id" isHidden="true"/>
    </fieldGroup>
    <fieldGroup
        name="Incidents"
        type="RelatedList"
        connectorObject="Incident_Asset_Connector_c"
        lookUpField="Tech_Asset_c"
        queryField="Incident_Report_Record_c"
        source="Incident_c">
        <field property="Id" isHidden="true" />
        <field property="Name"/>
        <field property="Description_c"/>
            <trigger name="Selected">
                <processRef id="IncidentDetails">
                    <parameter
                        name="IncidentId"
                        fieldName="Id"
                        fieldValue="[Id]"/>
                </processRef>
            </trigger>
    </fieldGroup>
</process>
```

In this example, if a manifest contains the process definition listed, roughly two logical sections would be presented on screen. The first section would reference the first fieldGroup definition while the second section would reference the related list fieldGroup definition.

In some embodiments, logical screen grouping one (i.e. the "General" fieldGroup) would display a series of field value pairs populated with from the current tech asset. However, logical screen grouping two (i.e. the "Incidents" fieldGroup) would display a list of associated Incident objects. Each item displayed in the related list fieldGroup results would present the Name and Description of the associated Incident.

If the user selects a related list result item, the trigger will be invoked and the target process "IncidentDetails" will be presented on screen.

The examples illustrating the use of technology disclosed herein should not be taken as limiting or preferred. This example sufficiently illustrates the technology disclosed without being overly complicated. It is not intended to illustrate all of the technologies disclosed.

A person having ordinary skill in the art will appreciate that there are many potential applications for one or more implementations of elements of this description, including manifest application in mobile device technology, and the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Figure 29:
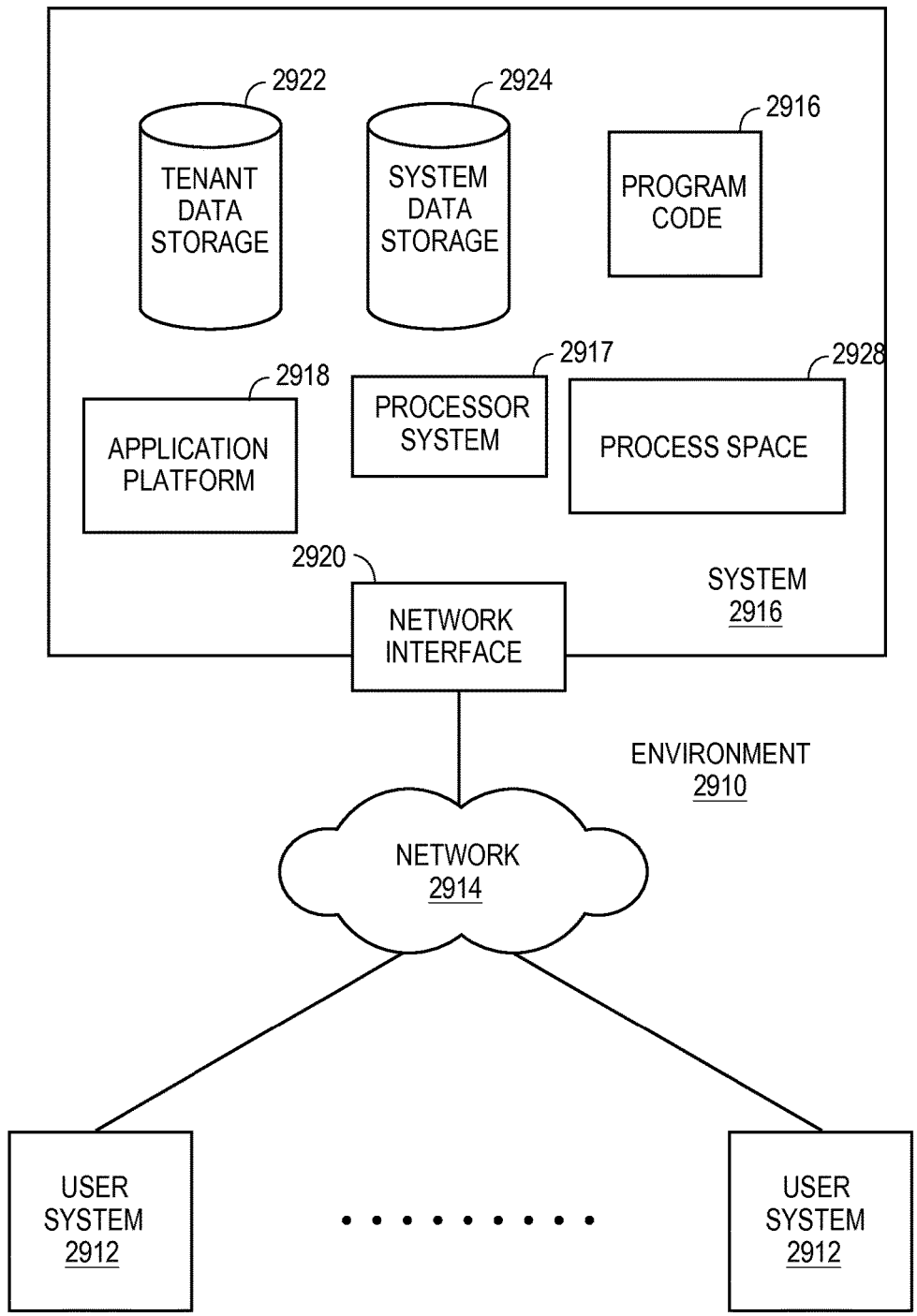
FIG. 29 illustrates a block diagram of an environment wherein manifest schema may be applied according to an embodiment.
Figure 30:
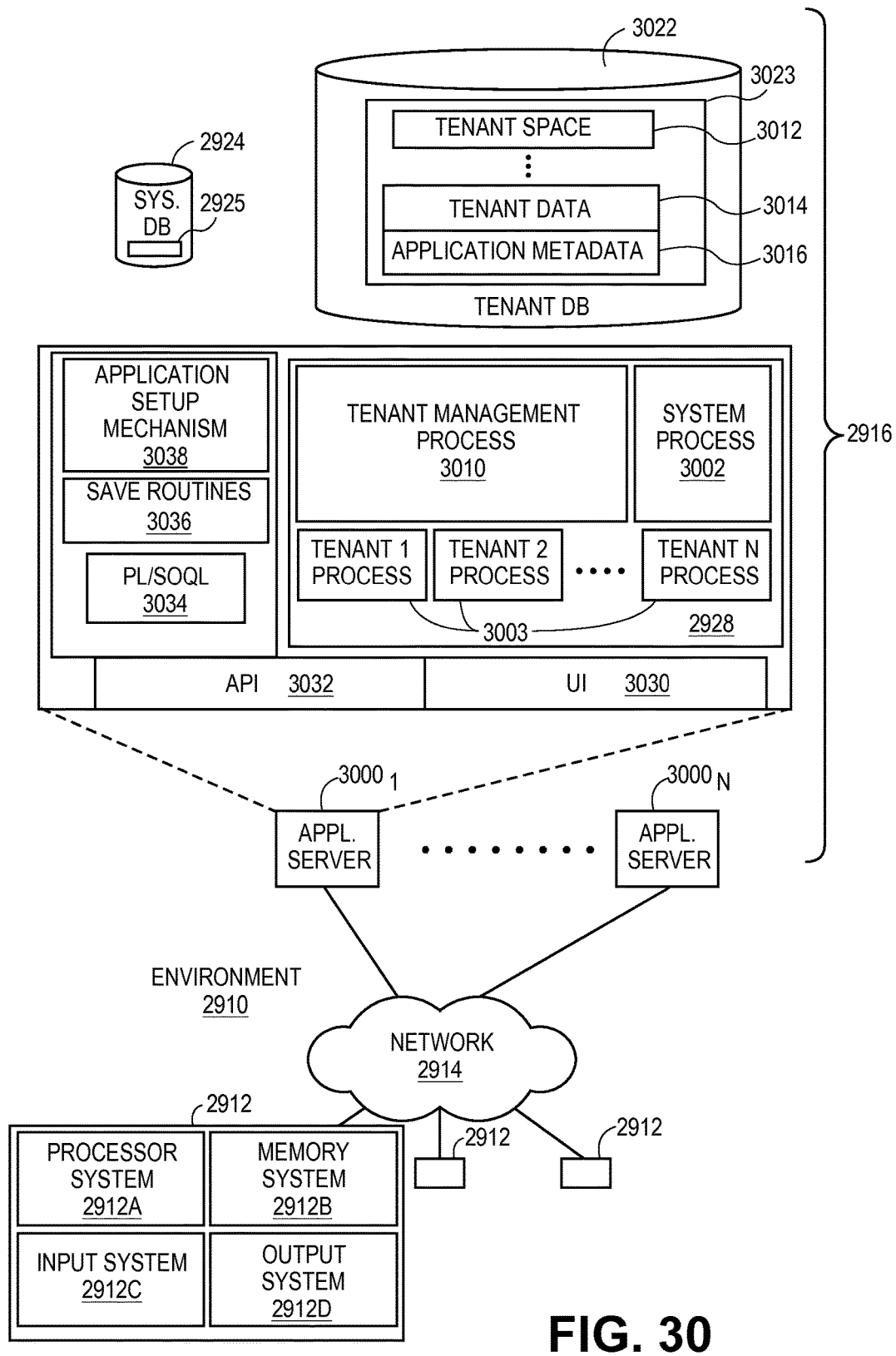
FIG. 30 illustrates details of an environment according to an embodiment.

FIG. 29 illustrates a block diagram of an environment wherein manifest schema may be applied according to an embodiment, and FIG. 30 illustrates details of an environment according to an embodiment. Components within an environment 2910 may belong to different layers (e.g., compute, management) and may communicate as described above. Environment 2910 may include user systems 2912, network 2914, system 2916, processor system 2917, application platform 2918, network interface 2920, tenant data storage 2922, system data storage 2924, program code 2926, and process space 2928. In other embodiments, environment 2910 may not have all of the components listed and/or may have other elements instead of, or in addition to, those listed above.

Environment 2910 is an environment in which an on-demand database service exists. User system 2912 may be any machine or system that is used by a user to access a database user system. For example, any of user systems 2912 can be a handheld computing device, a mobile phone, a laptop computer, a workstation, and/or a network of computing devices. As illustrated in FIG. 29, and in more detail in FIG. 30, user systems 2912 might interact via a network 2914 with an on-demand database service, which is system 2916.

An on-demand database service, such as system 2916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 2916" and "system 2916" will be used interchangeably herein.

A database image may include one or more database objects. A relational database management system (RDMS) or the equivalent may execute storage and retrieval of information against the database object(s). Application platform 2918 may be a framework that allows the applications of system 2916 to run, such as the hardware and/or software, e.g., the operating system. In an embodiment, on-demand database service 2916 may include an application platform 2918 that enables creation, managing and executing one or more applications developed by the provider of the on-demand database service, users accessing the on-demand database service via user systems 2912, or third party application developers accessing the on-demand database service via user systems 2912.

The users of user systems 2912 may differ in their respective capacities, and the capacity of a particular user system 2912 might be entirely determined by permissions (permission levels) for the current user. For example, where a salesperson is using a particular user system 2912 to interact with system 2916, that user system has the capacities allotted to that salesperson. However, while an administrator is using that user system to interact with system 2916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 2914 is any network or combination of networks of devices that communicate with one another. For example, network 2914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the Internet, that network will be used in many of the examples herein. However, it should be understood that the networks that are used in one or more implementations may be not limited in this manner, although TCP/IP is a frequently implemented protocol.

User systems 2912 might communicate with system 2916 using TCP/IP and, at a higher network level, use other common Internet protocols to communicate, such as HTTP, FTP, AFS, WAP, etc. In an example where HTTP is used, user system 2912 might include an HTTP client commonly referred to as a "browser" for sending and receiving HTTP messages to and from an HTTP server at system 2916. Such an HTTP server might be implemented as the sole network interface between system 2916 and network 2914, but other techniques might be used as well or instead. In some implementations, the interface between system 2916 and network 2914 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 2916, shown in FIG. 29, implements a web-based customer relationship management (CRM) system. For example, in one embodiment, system 2916 includes application servers configured to implement and execute CRM software applications as well as provide related data, code, forms, webpages and other information to and from user systems 2912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 2916 implements applications other than, or in addition to, a CRM application. For example, system 2916 may provide tenant access to multiple hosted (standard and custom) applications, including a CRM application. User (or third party developer) applications, which may or may not include CRM, may be supported by the application platform 2918, which manages creation, storage of the applications into one or more database objects and executing of the applications in a virtual machine in the process space of the system 2916.

One arrangement for elements of system 2916 is shown in FIG. 29, including a network interface 2920, application platform 2918, tenant data storage 2922 for tenant data 2923, system data storage 2924 for system data 2925 accessible to system 2916 and possibly multiple tenants, program code 2926 for implementing various functions of system 2916, and a process space 2928 for executing MTS system processes and tenant-specific processes, such as running applications as part of an application hosting service. Additional processes that may execute on system 2916 include database indexing processes.

Several elements in the system shown in FIG. 29 include conventional, well-known elements that are explained only briefly here. For example, each user system 2912 could include a desktop personal computer, workstation, laptop or notebook, tablet computer, smart phone, cell phone, or any wireless access protocol (WAP) enabled device or any other computing device capable of interfacing directly or indirectly to the Internet or other network connection. User system 2912 typically runs an HTTP client, e.g., a browsing program, such as Microsoft's Internet Explorer, Firefox, Chrome, or a mobile operating system browser in the case of a smart phone, cellular phone, or other wireless device, or the like, allowing a user (e.g., subscriber of the multi-tenant database system) of user system 2912 to access, process and view information, pages and applications available to it from system 2916 over network 2914. Each user system 2912 also typically includes one or more user interface devices, such as a keyboard, a mouse, trackball, touch pad, touch screen, pen, gesture recognition, or the like, for interacting with a graphical user interface (GUI) provided by the browser on a display (e.g., a monitor screen, LCD display, etc.) in conjunction with pages, forms, applications and other information provided by system 2916 or other systems or servers. For example, the user interface device can be used to access data and applications hosted by system 2916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 2912 and all of its components are operator configurable using applications, such as a browser, including computer code run using a central processing unit such as an Intel processor, including Celeron®, Pentium®, Core®, and Xeon® processors, or the like. Similarly, system 2916 (and additional instances of an MTS, where more than one is present) and all of their components might be operator configurable using application(s) including computer code to run using a central processing unit such as processor system 2917, which may include an Intel processor or the like, and/or multiple processor units.

A computer program product embodiment includes a machine-readable storage medium (media), including non-transitory computer-readable storage media, having instructions stored thereon/in that can be used to program a computer to perform any of the processes of the embodiments described herein. Computer code for operating and configuring system 2916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 2916 is configured to provide webpages, forms, applications, data and media content to user (client) systems 2912 to support the access by user systems 2912 as tenants of system 2916. As such, system 2916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 30 also illustrates environment 2910. However, in FIG. 30 elements of system 2916 and various interconnections in an embodiment are further illustrated. FIG. 30 shows that user system 2912 may include processor system 2912A, memory system 2912B, input system 2912C, and output system 2912D. FIG. 30 shows network 2914 and system 29116. FIG. 30 also shows that system 2916 may include tenant data storage 2922, tenant data 2923, system data storage 2924, system data 2925, User Interface (UI) 3030, Application Program Interface (API) 3032, PL/SOQL (Procedural Language/Salesforce Object Query Language) 3034, save routines 3036, application setup mechanism 3038, applications servers $3000_1$-$3000_N$, system process space 3002, tenant process spaces 3004, tenant management process space 3010, tenant storage space 3012, tenant data 3014, and application metadata 3016. In other embodiments, environment 2910 may not have the same elements as those listed above and/or may have other elements instead of, or in addition to, those listed above.

User system 2912, network 2914, system 2916, tenant data storage 2922, and system data storage 2924 were discussed above in FIG. 29. Regarding user system 2912, processor system 2912A may be any combination of one or more processors. Memory system 2912B may be any combination of one or more memory devices, short term, and/or long term memory. Input system 2912C may be any combination of input devices, such as one or more keyboards, mice, trackballs, scanners, cameras, and/or interfaces to networks. Output system 2912D may be any combination of output devices, such as one or more monitors, printers, and/or interfaces to networks. As shown by FIG. 30, system 2916 may include a network interface 2920 (illustrated in FIG. 29) implemented as a set of HTTP application servers 3000, an application platform 2918, tenant data storage 2922, and system data storage 2924.

Also shown in FIG. 30 is a system process space 3002, including individual tenant process spaces 3004 and a tenant management process space 3010. Each application server 3000 may be configured to tenant data storage 2922 and the tenant data 2923 therein, and system data storage 2924 and the system data 2925 therein to serve requests of user systems 2912. The tenant data 2923 might be divided into individual tenant storage spaces 2912, which can be either a physical arrangement and/or a logical arrangement of data. Within each tenant storage space 3012, tenant data 3014 and application metadata 3016 might be similarly allocated for each user. For example, a copy of a user's most recently used (MRU) items might be stored to tenant data 3014. Similarly, a copy of MRU items for an entire organization that is a tenant might be stored to tenant storage space 3012. A UI 3030 provides a user interface and an API 3032 provides an application programmer interface to system 2916 resident processes to users and/or developers at user systems 2912. The tenant data and the system data may be stored in various databases, such as one or more Oracle™ databases.

Application platform 2918 includes an application setup mechanism 3038 that supports application developers' creation and management of applications, which may be saved as metadata into tenant data storage 2922 by save routines 3036 for execution by subscribers as one or more tenant process spaces 3004 managed by tenant management process 3010 for example. Invocations to such applications may be coded using PL/SOQL 3034 that provides a programming language style interface extension to API 3032. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 3016 for the subscriber making the invocation and executing the metadata as an application in a virtual machine.

Each application server 3000 may be communicably coupled to database systems, e.g., having access to system data 2925 and tenant data 2923, via a different network connection. For example, one application server $3000_1$ might be coupled via the network 2914 (e.g., the Internet), another application server $3000_{N-1}$ might be coupled via a direct network link, and another application server $3000_N$ might be coupled by yet a different network connection. Transfer Control Protocol and Internet Protocol (TCP/IP) are typical protocols for communicating between application servers 3300 and the database system. However, it will be apparent to one skilled in the art that other transport protocols may be used to optimize the system depending on the network interconnect used.

In certain embodiments, each application server 3000 is configured to handle requests for any user associated with any organization that is a tenant. Because it is desirable to be able to add and remove application servers from the server pool at any time for any reason, there is preferably no server affinity for a user and/or organization to a specific application server 3000. In one embodiment, therefore, an interface system implementing a load balancing function (e.g., an F5 Big-IP load balancer) is communicably coupled between the application servers 3000 and the user systems 2912 to distribute requests to the application servers 3000. In one embodiment, the load balancer uses a least connections algorithm to route user requests to the application servers 3000. Other examples of load balancing algorithms, such as round robin and observed response time, also can be used. For example, in certain embodiments, three consecutive requests from the same user could hit three different application servers 3000, and three requests from different users could hit the same application server 3000. In this manner, system 2916 is multi-tenant, wherein system 2916 handles storage of, and access to, different objects, data and applications across disparate users and organizations.

As an example of storage, one tenant might be a company that employs a sales force where each salesperson uses system 2916 to manage their sales process. Thus, a user might maintain contact data, leads data, customer follow-up data, performance data, goals and progress data, etc., all applicable to that user's personal sales process (e.g., in tenant data storage 2922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 2916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 2916 might also maintain system level data usable by multiple tenants or other data. Such system level data might include industry reports, news, postings, and the like that are sharable among tenants.

In certain embodiments, user systems 2912 (which may be client systems) communicate with application servers 3000 to request and update system-level and tenant-level data from system 2916 that may require sending one or more queries to tenant data storage 2922 and/or system data storage 2924. System 2916 (e.g., an application server 3000 in system 2916) automatically generates one or more SQL statements (e.g., one or more SQL queries) that are designed to access the desired information. System data storage 2924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers. Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described, but can be practiced with modification and alteration within the spirit and scope of the appended claims. The description is thus to be regarded as illustrative instead of limiting.

What is claimed is:

1. A method comprising:
loading a first manifest schema on a memory of a mobile device to provide application workflows for the mobile device, the first manifest schema including a first parent manifest and an application manifest for each of a first plurality of applications for a computing environment of the mobile device;
loading a second manifest schema different from the first manifest schema on the memory of the mobile device to dynamically modify the computing environment of the mobile device including providing modified application workflows for the mobile device, the second manifest schema including a second parent manifest and an application manifest for each of a second plurality of applications, each of the first and second parent manifests including a set of application notification nodes for routing of messages to the applications on the mobile device, and each application manifest including a set of process notification nodes for routing messages to processes on the mobile device;
in response to the loading of the second manifest schema, the mobile device automatically making one or more calls to a server to populate a modified user interface of the mobile device based on the second manifest schema, and establishing applications and processes for the mobile device based on the second manifest schema without restructuring the computing environment of the mobile device;
upon receiving a message at the mobile device sent to the second manifest schema, the mobile device utilizing the second parent manifest to automatically select an application of the second plurality of applications for routing of the message, the selection of the application being based on contents of the message;
fetching the application manifest for the selected application and utilizing the application manifest to automatically select a process of a plurality of processes of the selected application for routing of the message on the mobile device, the selection of the process being based on the contents of the message; and
routing the message to the selected process of the selected application on the mobile device.

2. The method of claim 1, wherein the first or second parent manifest drives a main menu wallet used to facilitate a display of the user interface of the mobile device.

3. The method of claim 1, wherein the set of application notification nodes of the first or second parent manifest includes an ordered list of application notification nodes for routing of messages to the first or second plurality of applications.

4. The method of claim 3, wherein a first most specific match of application notification node for the message is used to route the message to the selected application.

5. The method of claim 3, wherein the set of process notification nodes of the selected application manifest includes an ordered list of process notification nodes for routing of messages to the plurality of processes of the selected application.

6. The method of claim 5, wherein a first most specific match of process notification node for the message is used to route the message to the selected process of the plurality of processes of the application.

7. The method of claim 3, further comprising displaying an error message on the mobile device if no matching notification node is found.

8. The method of claim 1, wherein the mobile device is in a multi-tenant environment.

9. A mobile device comprising:
a memory for the storage of data;
a processor, the processor to:

load a first manifest schema on a memory of a mobile device to provide application workflows for the mobile device, the first manifest schema including a first parent manifest and an application manifest for each of a first plurality of applications for a computing environment of the mobile device;

load a second manifest schema different from the first manifest schema into the memory to dynamically modify the computing environment of the mobile device including providing modified application workflows for the mobile device, the second manifest schema including a second parent manifest and an application manifest for each of a second plurality of applications, each of the first and second parent manifests including a set of application notification nodes for routing of messages to the applications on the mobile device, and each application manifest including a set of process notification nodes for routing messages to processes on the mobile device;

a network interface for receipt of a message, the processor to route the message to an application of the plurality of applications and to a process of a plurality of processes of the selected application, the processor to:

in response to the loading of the second manifest schema, automatically make one or more calls to a server to populate a modified user interface of the mobile device based on the second manifest schema, and establish applications and processes for the mobile device based on the second manifest schema without restructuring the computing environment of the mobile device;

automatically select the application for routing of the message based on contents of the message using the second parent manifest, fetch the application manifest for the selected application and automatically select the process for routing of the message on the mobile device based on the contents of the message using the application manifest for the selected application, and route the message to the selected process of the selected application on the mobile device; and a display to display the user interface.

10. The mobile device of claim 9, wherein the first or second parent manifest drives a main menu wallet used to facilitate the display of the user interface of the mobile device.

11. The mobile device of claim 9, wherein the set of application notification nodes of the first or second parent manifest includes an ordered list of application notification nodes for routing of messages to the first or second plurality of applications.

12. The mobile device of claim 11, wherein a first most specific match of application notification node for the message is used to route the message to the selected application.

13. The mobile device of claim 12, wherein the set of process notification nodes of the selected application manifest includes an ordered list of process notification nodes for routing of messages to processes of the selected application.

14. The mobile device of claim 13, wherein a first most specific match of process notification node for the message is used to route the message to the selected process of the plurality of processes of the application.

15. The mobile device of claim 11, wherein the mobile device is to display an error message if no matching application notification node is found.

16. The mobile device of claim 9, wherein the mobile device is in a multi-tenant environment.

17. A non-transitory computer-readable storage medium having stored thereon data representing sequences of instructions that, when executed by a processor, cause the processor to perform operations comprising:

loading a first manifest schema on a memory of a mobile device to provide application workflows for the mobile device, the first manifest schema including a first parent manifest and an application manifest for each of a first plurality of applications for a computing environment of the mobile device;

loading a second manifest schema different from the first manifest schema on the memory of the mobile device to dynamically modify the computing environment of the mobile device including providing modified application workflows for the mobile device, the second manifest schema including a second parent manifest and an application manifest for each of a second plurality of applications, each of the first and second parent manifests including a set of application notification nodes for routing of messages to the applications on the mobile device, and each application manifest including a set of process notification nodes for routing messages to processes on the mobile device;

in response to the loading of the second manifest schema, the mobile device automatically making one or more calls to a server to populate a modified user interface of the mobile device based on the second manifest schema, and establishing applications and processes for the mobile device based on the second manifest schema without restructuring the computing environment of the mobile device;

upon receiving a message at the mobile device sent to the second manifest schema, the mobile device utilizing the second parent manifest to automatically select an application of the second plurality of applications for routing of the message, the selection of the application being based on contents of the message;

fetching the application manifest for the selected application and utilizing the application manifest to automatically select a process of a plurality of processes of the selected application for routing of the message on the mobile device, the selection of the process being based on the contents of the message; and routing the message to the selected process of the selected application on the mobile device.

18. The medium of claim 17, further comprising instructions that, when executed by the processor, cause the processor to perform operations comprising:

routing the message to a final destination based on the contents of the message.

19. The medium of claim 17, wherein the first or second parent manifest drives a main menu wallet used to facilitate a display of the user interface of the mobile device.

20. The medium of claim 17, wherein the set of application notification nodes of the first or second parent manifest includes an ordered list of application notification nodes for routing of messages to the first or second plurality of applications.

21. The medium of claim 20, wherein a first most specific match of application notification node for the message is used to route the message to the selected application.

22. The medium of claim 20, wherein the set of process notification nodes of the selected application manifest includes an ordered list of process notification nodes for routing of messages to the plurality of processes of the selected application.

23. The medium of claim 22, wherein a first most specific match of process notification node for the message is used to route the message to the selected process of the plurality of processes of the application.

24. The medium of claim 20, further comprising instructions that, when executed by the processor, cause the processor to perform operations comprising:

displaying an error message on the mobile device if no matching notification node is found.

* * * * *